US012810779B2

(12) United States Patent
Cha et al.

(10) Patent No.: US 12,810,779 B2
(45) Date of Patent: Nov. 24, 2026

(54) DISPLAY DEVICE INCLUDING AN ASYMMETRICAL PATTERN

(71) Applicant: SAMSUNG DISPLAY CO., LTD., Yongin-si (KR)

(72) Inventors: Na Hyeon Cha, Yongin-si (KR); Jun Hyun Park, Yongin-si (KR); Sun Kwun Son, Yongin-si (KR); Cheol-Gon Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/066,719

(22) Filed: Feb. 28, 2025

(65) Prior Publication Data

US 2026/0004714 A1 Jan. 1, 2026

(30) Foreign Application Priority Data

Jul. 1, 2024 (KR) ........................ 10-2024-0086104

(51) Int. Cl.

| | |
|---|---|
| ***G09G 3/32*** | (2016.01) |
| ***G09G 3/3233*** | (2016.01) |
| ***G09G 3/3266*** | (2016.01) |

(52) U.S. Cl.

CPC ............. *G09G 3/32* (2013.01); *G09G 3/3233* (2013.01); *G09G 3/3266* (2013.01); (Continued)

(58) Field of Classification Search

CPC ...... G09G 3/32; G09G 3/3233; G09G 3/3266; G09G 2300/0426; G09G 2300/043; (Continued)

(56) References Cited

U.S. PATENT DOCUMENTS

| | | | | |
|---|---|---|---|---|
| 10,332,446 | B2 * | 6/2019 | Chen | H10D 86/423 |
| 2014/0292732 | A1 * | 10/2014 | Niioka | G09G 3/3648 345/204 |
| 2021/0202647 | A1 * | 7/2021 | Wang | H10D 86/423 |

FOREIGN PATENT DOCUMENTS

| | | |
|---|---|---|
| KR | 10-2016-0098650 A | 8/2016 |
| KR | 10-2018-0093147 A | 8/2018 |

(Continued)

*Primary Examiner* — Nelson M Rosario

(74) *Attorney, Agent, or Firm* — F. CHAU & ASSOCIATES, LLC

(57) ABSTRACT

A display device includes: a substrate; a first scan line and a second scan line disposed on the substrate; a data line intersecting the first scan line and the second scan line; a first pixel circuit portion and a second pixel circuit portion adjacent to each other in a first direction with the data line therebetween; and a shielding pattern disposed between the first pixel circuit portion and the second pixel circuit portion, wherein each of the first pixel circuit portion and the second pixel circuit portion includes a first transistor including a first gate electrode connected to a first node, and a first electrode connected to a second node; and a second transistor connected between the first node and the data line and including a second gate electrode capable of receiving a first scan signal, and the shielding pattern includes an asymmetrical portion protruding toward the first pixel circuit portion in a plan view.

20 Claims, 25 Drawing Sheets

(52) U.S. Cl.
CPC ................. *G09G 2300/043* (2013.01); *G09G 2300/0819* (2013.01); *G09G 2310/0267* (2013.01); *G09G 2320/0233* (2013.01)

(58) Field of Classification Search
CPC .............. G09G 2300/0819; G09G 2310/0267; G09G 2320/0233; H10K 59/1213; H10K 59/1216; H10K 59/126; H10K 59/131
See application file for complete search history.

(56) References Cited

FOREIGN PATENT DOCUMENTS

| | | | |
|---|---|---|---|
| KR | 10-2022-0110462 | A | 8/2022 |
| KR | 10-2022-0125909 | A | 9/2022 |
| KR | 10-2024-0042793 | A | 4/2024 |

* cited by examiner

FIG. 19

| | GRAY | Comparative example | Embodiment |
|---|---|---|---|
| ΔI_RED | 255G | -1.2 % | -0.2 % |
| | 87G | 0.9 % | 0.0 % |
| | 31G | 5.4 % | 0.1 % |
| | 11G | 25.4 % | 3.4 % |

DISPLAY DEVICE INCLUDING AN ASYMMETRICAL PATTERN

CROSS-REFERENCE TO RELATED APPLICATION

This application claims priority to and the benefit of Korean Patent Application No. 10-2024-0086104 filed at the Korean Intellectual Property Office on Jul. 1, 2024, the entire contents of which are herein incorporated by reference.

BACKGROUND

(a) Technical Field

The present disclosure relates to a display device, and more particularly to a display device including an asymmetrical pattern.

(b) Discussion of Related Art

A display device is a device that may display an image. The display device may include a plurality of pixels, which are units for displaying the image. Each pixel may include a pixel circuit portion including a plurality of transistors and a light emitting element connected to the pixel circuit portion. The plurality of transistors of the pixel circuit portion may be connected to various signal lines and voltage lines, including data lines, and may transmit a driving current to the light emitting element.

The plurality of pixels may be connected to a scan line to sequentially receive data signals according to a scan signal. Each pixel may display an image with luminance corresponding to a data signal.

SUMMARY

Embodiments provide a display device that may reduce or eliminate display defects such as deviations in driving current and luminance of light emitting elements and stains of images that may occur when a node of a transistor of an adjacent pixel is affected when a scan signal is applied to a pixel.

An embodiment provides a display device including: a substrate; a first scan line and a second scan line disposed on the substrate; a data line intersecting the first scan line and the second scan line; a first pixel circuit portion and a second pixel circuit portion adjacent to each other in a first direction with the data line therebetween; and a shielding pattern disposed between the first pixel circuit portion and the second pixel circuit portion, wherein each of the first pixel circuit portion and the second pixel circuit portion comprises: a first transistor including a first gate electrode connected to a first node, and a first electrode connected to a second node; and a second transistor connected between the first node and the data line and including a second gate electrode capable of receiving a first scan signal, and the shielding pattern includes an asymmetrical portion protruding toward the first pixel circuit portion in a plan view.

The shielding pattern and the asymmetrical portion may be disposed on a same conductive layer.

The shielding pattern may transmit a constant voltage.

The shielding pattern overlaps the data line in a plan view and extends in a second direction perpendicular to the first direction.

The first electrode may include a lower electrode overlapping the first gate electrode, and the first gate electrode and the lower electrode may overlap each other to form a first capacitor.

The first electrode may further include an upper electrode overlapping the first gate electrode, and the first gate electrode and the upper electrode may overlap each other to form the first capacitor.

The lower electrode, the first gate electrode, and the upper electrode may be sequentially disposed on the substrate and overlap each other in a plan view.

The asymmetrical portion is disposed in the first direction between the second gate electrode and the first electrode of the first pixel circuit portion in a plan view.

The asymmetrical portion is a wing portion that may protrude toward the first pixel circuit portion.

The display device may further include a first power line electrically connected to a second electrode of the first transistor and transmitting a first power voltage, wherein the shielding pattern may be electrically connected to the first power line.

The display device may further include a gate driver that transmits a first scan signal to the first scan line and a second scan signal to the second scan line, wherein the second scan signal may change from a turn-off voltage level to a turn-on voltage level while the first scan signal is at the turn-on voltage level, and may change to the turn-off voltage level after the first scan signal changes to the turn-off voltage level.

The first scan line and the second scan line may be repeatedly disposed for each pixel row in pairs.

Another embodiment provides a display device including: a substrate; a first scan line and a second scan line disposed on the substrate; a data line intersecting the first scan line and the second scan line; and a first pixel circuit portion and a second pixel circuit portion adjacent to each other in a first direction with the data line therebetween, wherein each of the first pixel circuit portion and the second pixel circuit portion includes a first transistor including a first gate electrode connected to a first node, and a first electrode connected to a second node; and a second transistor connected between the first node and the data line and including a second gate electrode capable of receiving a first scan signal, and a shape of the second gate electrode included in the second pixel circuit portion is different from a shape of the second gate electrode included in the first pixel circuit portion.

A difference between the shapes of the second gate electrode of the first pixel circuit portion and the second pixel circuit portion may include a protrusion of the second pixel circuit portion included in the second pixel circuit portion protruding toward at least one of the first gate electrode or the first electrode.

A shortest distance between the second gate electrode included in the second pixel circuit portion and the first electrode or the first gate electrode of the second pixel circuit portion may be shorter than the shortest distance between the second gate electrode included in the first pixel circuit portion and the first electrode or the first gate electrode of the first pixel circuit portion.

The display device may further include a gate driver that transmits a first scan signal to the first scan line and a second scan signal to the second scan line, wherein the second scan signal may change from a turn-off voltage level to a turn-on voltage level while the first scan signal is at the turn-on voltage level, and may change to the turn-off voltage level after the first scan signal changes to the turn-off voltage level.

Another embodiment provides a display device including: a substrate; a first scan line and a second scan line disposed on the substrate; a data line intersecting the first scan line and the second scan line; and a first pixel circuit portion and a second pixel circuit portion adjacent to each other in a first direction with the data line therebetween, wherein each of the first pixel circuit portion and the second pixel circuit portion includes a first transistor including a first gate electrode connected to a first node, and a first electrode connected to a second node; and a second transistor connected between the first node and the data line and including a second gate electrode capable of receiving a first scan signal, and a shape of the first electrode included in the second pixel circuit portion is different from a shape of the first electrode included in the first pixel circuit portion.

A difference between the shapes of the first gate electrodes of the first pixel circuit portion and the second pixel circuit portion may include a protrusion of the first electrode included in the second pixel circuit portion protruding toward the second gate electrode.

The shortest distance between the second gate electrode included in the second pixel circuit portion and the first electrode or the first gate electrode of the second pixel circuit portion may be shorter than the shortest distance between the second gate electrode included in the first pixel circuit portion and the first electrode or the first gate electrode of the first pixel circuit portion.

The display device may further include a gate driver that transmits a first scan signal to the first scan line and a second scan signal to the second scan line, wherein the second scan signal may change from a turn-off voltage level to a turn-on voltage level while the first scan signal is at the turn-on voltage level, and may change to the turn-off voltage level after the first scan signal changes to the turn-off voltage level.

An embodiment provides an electronic device including a display module; and a processor electrically connected to the display module, wherein the display module comprises: a substrate; a first scan line and a second scan line disposed on the substrate; a data line intersecting the first scan line and the second scan line; a first pixel circuit portion and a second pixel circuit portion adjacent to each other in a first direction with the data line therebetween; and a shielding pattern disposed between the first pixel circuit portion and the second pixel circuit portion, wherein each of the first pixel circuit portion and the second pixel circuit portion comprises: a first transistor including a first gate electrode connected to a first node, and a first electrode connected to a second node; and a second transistor connected between the first node and the data line and including a second gate electrode capable of receiving a first scan signal, and the shielding pattern includes an asymmetrical portion protruding toward the first pixel circuit portion in a plan view.

According to some embodiments, when a scan signal is applied to a pixel, the scan signal can reduce display defects of the pixel such as deviations in driving current and luminance of light emitting elements and/or stains of images that may be caused by affecting a voltage at a node of a transistor in an adjacent pixel.

BRIEF DESCRIPTION OF THE DRAWINGS

FIG. 19 is a table showing a difference between driving currents of two adjacent pixels for various grayscales in a display device according to a comparative example and a display device according to an embodiment.

DETAILED DESCRIPTION

Figure 1:
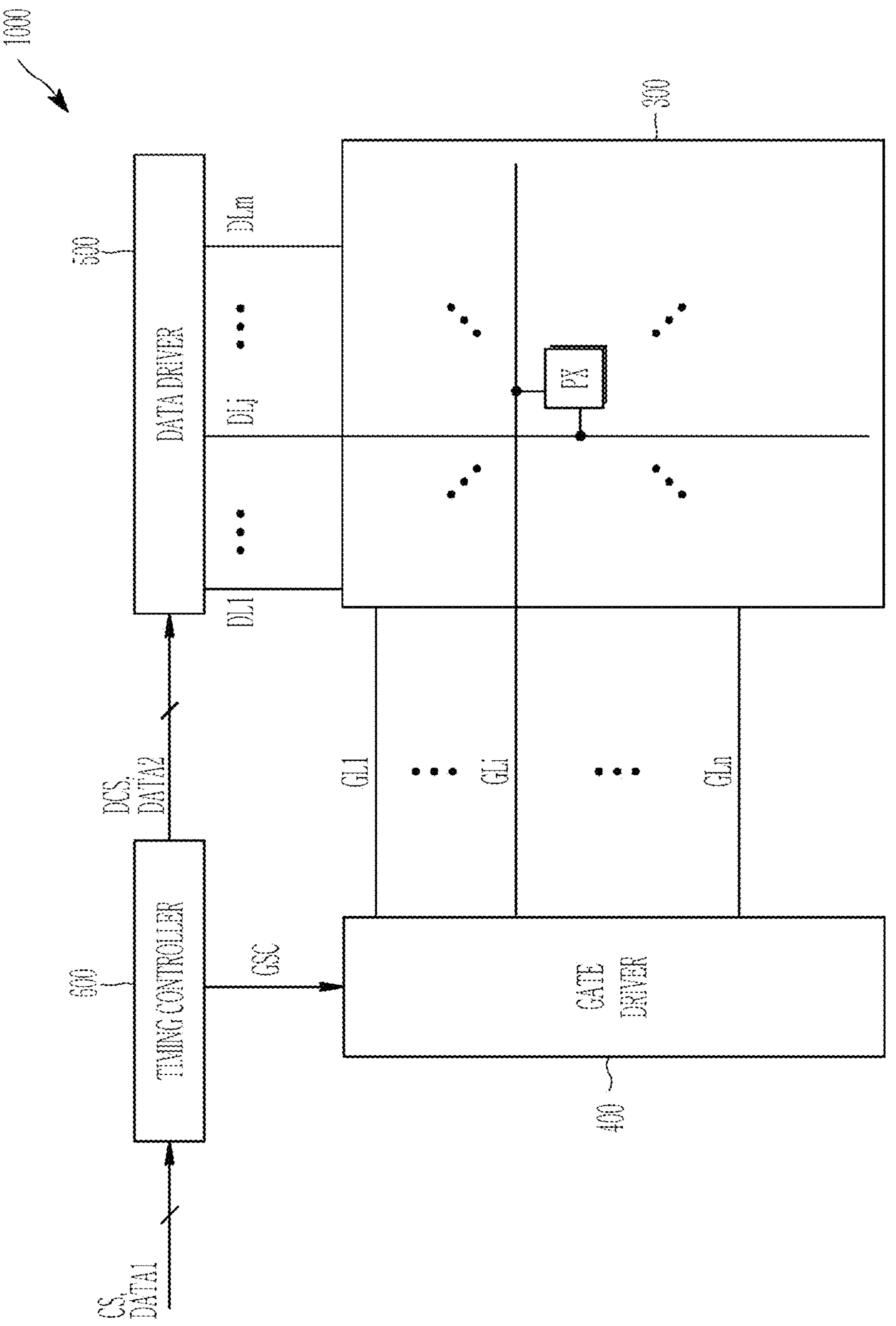
FIG. 1 is a block diagram of a display device according to an embodiment.

The present disclosure will be described more fully hereinafter with reference to the accompanying drawings, in which embodiments of the disclosure are shown. As those skilled in the art would realize, embodiments may be modified in various different ways, all without departing from the spirit or scope of the present disclosure.

In order to clearly describe the present disclosure, parts or portions that may be irrelevant to the description may be omitted or simplified, and identical or similar constituent elements throughout the specification may be denoted by the same reference numerals.

Further, in the drawings, the size and thickness of each element may be arbitrarily illustrated for ease of description, and the present disclosure is not necessarily limited to those illustrated in the drawings. In the drawings, the thicknesses of layers, films, panels, regions, and areas, may be exaggerated for clarity. In the drawings, for ease of description, the thicknesses of layers and areas may be exaggerated.

It should be understood that when an element such as a layer, film, region, area, or substrate is referred to as being “on” or “above” another element, it can be directly on the other element or intervening elements may also be present. In contrast, when an element is referred to as being “directly on” another element, there are no intervening elements present. Further, in the specification, the word “on” or “above” means disposed on or below the object portion, and does not necessarily mean disposed on the upper side of the object portion based on a gravitational direction.

In addition, unless explicitly described to the contrary, the word “comprise” and variations such as “comprises” or “comprising” should be understood to imply the inclusion of stated elements and not the exclusion of any other elements.

Further, in the specification, the phrase “in a plan view” or “on a plane” means when an object portion is viewed from above, and it may mean a plane parallel to a first direction DR1 and a second direction DR2 in the present description. The phrase “in a cross-sectional view” means when a cross-section taken by vertically cutting an object portion is viewed from the side, and it may mean a cross-section taken by cutting an object portion in a direction parallel to a third direction DR3 in the present description.

In the specification, the second direction DR2 may intersect the first direction DR1. The second direction DR2 may be perpendicular the first direction DR1 A third direction DR3 may be perpendicular to both the first direction DR1 and the second direction DR2.

Hereinafter, a display device according to an embodiment will be described with reference to FIG. 1.

FIG. 1 is a block diagram of a display device according to an embodiment.

A display device 1000 according to an embodiment may be a light emitting display device including an organic light emitting element or an inorganic light emitting element. However, the present disclosure is not limited thereto, and the display device 1000 may be various display devices such as a liquid crystal display or an electrophoretic display (EPD). In addition, the display device 1000 may be implemented as a flexible display device, a rollable display device, a curved display device, a transparent display device, or a mirror display device.

Referring to FIG. 1, the display device 1000 according to an embodiment may include a display panel 300, a gate driver 400 (or a scan driver), a data driver 500, and a timing controller 600.

The display panel 300 may include a plurality of pixels PX. Each pixel of the plurality of pixels PX may be a unit capable of emitting light. The plurality of pixels PX may display an image. A plurality of gate lines GL1 to GLn and a plurality of data lines DL1 to DLm may be connected to the plurality of pixels PX. Here, n and m may be a same positive integer or different positive integers.

The pixel PX may emit light with a luminance corresponding to a data signal transmitted through the data lines DL1 to DLm in response to a gate signal transmitted through the gate lines GL1 to GLn. An area in which the plurality of pixels PX are disposed may be referred to as a display area. An area around the display area may be referred to as a peripheral area. The plurality of pixels PX may include pixels capable of emitting light of different colors. For example, the plurality of pixels PX may include pixels capable of emitting, for example, red light, pixels capable of emitting green light, and pixels capable of emitting blue light.

The gate driver 400 may generate a gate signal (for example, a gate signal of a turn-on voltage level for turning on a transistor) based on a gate control signal GCS (or a scan control signal), and may sequentially provide the gate signal to the gate lines GL1 to GLn. The gate control signal GCS may include one or more signals. For example, the gate control signal GCS may include a start signal and a clock signal. The gate control signal GCS may be provided by the timing controller 600. The gate driver 400 may include a plurality of transistors that may be disposed and integrated in a peripheral area of the display panel 300.

The data driver 500 may generate data signals based on image data DATA2 and a data control signal DCS provided by the timing controller 600. The data driver 500 may provide the data signals to the display panel 300. The data control signal DCS may be a signal for controlling an operation of the data driver 500. The data control signal DCS may include one or more signals. For example, the data control signal DCS may include a horizontal start signal, a data clock signal, and the like.

The timing controller 600 may receive input image data DATA1 and a control signal CS from the outside. The timing controller 600 may generate the gate control signal GCS and the data control signal DCS based on the control signal CS. The timing controller 600 may convert the input image data DATA1 to generate the image data DATA2.

At least one of the gate driver 400, the data driver 500, or the timing controller 600 may be formed on the display panel 300, or connected to the display panel 300 through a flexible circuit board in the form of an integrated circuit.

A pixel circuit portion of a pixel PX of a display device according to an embodiment will be described as an example with reference to FIG. 2 together with FIG. 1.

Figure 2:
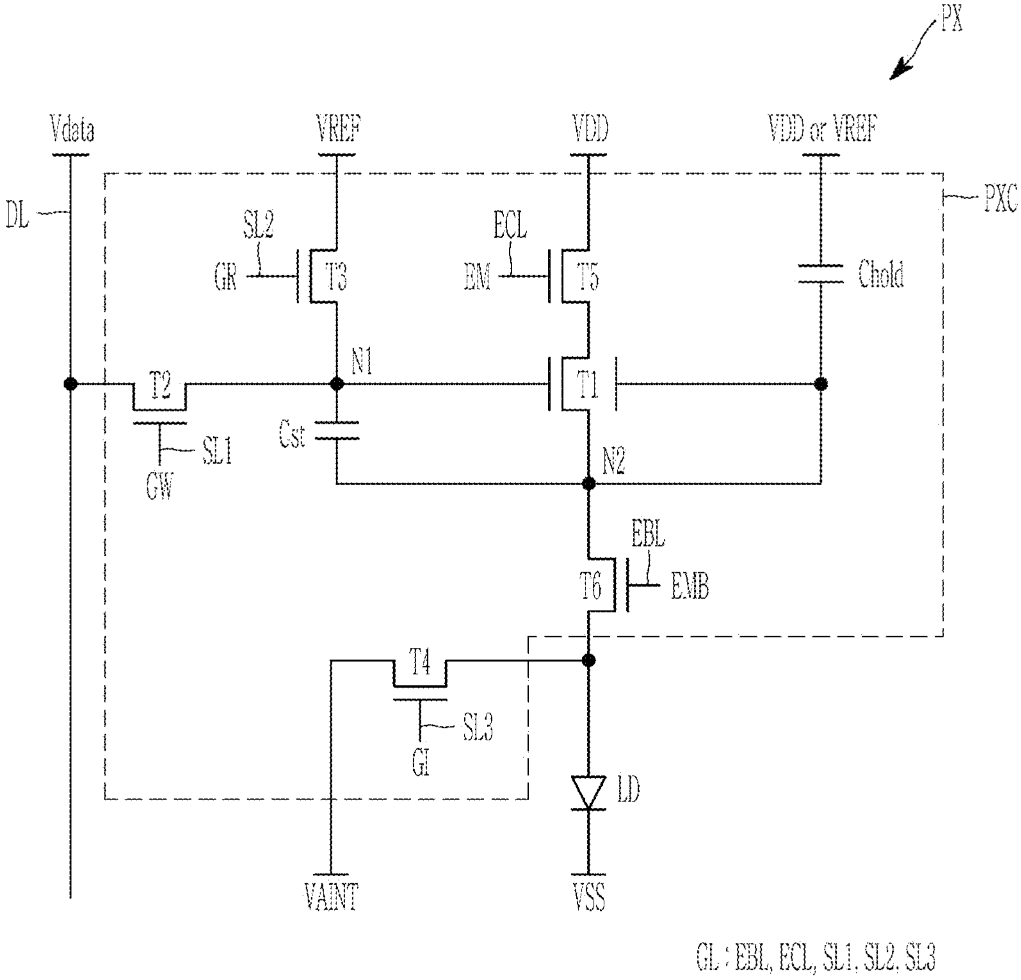
FIG. 2 is a circuit diagram of a circuit portion of a pixel of a display device according to an embodiment.

FIG. 2 is a circuit diagram of a circuit portion of a pixel of a display device according to an embodiment.

Referring to FIG. 1 and FIG. 2, the pixel PX may include a pixel circuit portion PXC and a light emitting element LD.

The pixel circuit portion PXC may be connected to a gate line GL and a data line DL. The gate line GL may be one of the gate lines GL1 to GLn of FIG. 1, and the data line DL may be one of the data lines DL1 to DLm of FIG. 1. The gate line GL may include a first scan line SL1, a second scan line SL2, a third scan line SL3, a first light emitting control line ECL, and a second light emitting control line EBL. Driving signals may be applied to the gate line GL and the data line DL. A first scan signal GW may be applied to the first scan line SL1, a second scan signal GR may be applied to the second scan line SL2, and a third scan signal GI may be applied to the third scan line SL3. A first light emitting control signal EM may be applied to the first light emitting control line ECL, a second light emitting control signal EMB may be applied to the second light emitting control line EBL, and a data signal Vdata (or a data voltage) may be applied to the data line DL.

The pixel circuit portion PXC may include a plurality of transistors and at least one capacitor. The plurality of transistors may include a second transistor T2 connected to the data line DL and the first scan line SL1.

The pixel circuit portion PXC may include a first transistor T1 (or a driving transistor), the second transistor T2, and a first capacitor Cst (or a storage capacitor). In addition, the pixel circuit portion PXC may include a third transistor T3, a fourth transistor T4, a fifth transistor T5, a sixth transistor T6, and a second capacitor Chold (or a hold capacitor).

The first transistor T1 may be electrically connected between a first power voltage VDD and a second node N2.

For example, a first electrode of the first transistor T1 may be connected to the first power voltage VDD through the fifth transistor T5, and a second electrode of the first transistor T1 may be connected to the second node N2. A gate electrode of the first transistor T1 may be coupled to a first node N1. In addition, the first transistor T1 may include a lower electrode corresponding to the gate electrode, and the lower electrode may be connected to the second node N2. The first transistor T1 may supply a driving current to the light emitting element LD. The first transistor T1 may control an amount of the driving current flowing through the light emitting element LD. For example, the first transistor T1 may supply a driving current corresponding to a voltage of the second node N2 to the light emitting element LD.

The second transistor T2 may be electrically connected between the data line DL and the first node N1. A gate electrode of the second transistor T2 may be connected to the first scan line SL1. The second transistor T2 may be turned on in response to the first scan signal GW of the first scan line SL1. When the second transistor T2 is turned on, the data signal Vdata of the data line DL may be transmitted to the first node N1.

The third transistor T3 may be electrically connected between a reference voltage VREF and the first node N1. A gate electrode of the third transistor T3 may be connected to the second scan line SL2. The third transistor T3 may be turned on in response to the second scan signal GR of the second scan line SL2. When the third transistor T3 is turned on, the reference voltage VREF may be transmitted to the first node N1.

The fourth transistor T4 may be electrically connected between an anode electrode of the light emitting element LD and an initialization voltage VAINT. A gate electrode of the fourth transistor T4 may be connected to the third scan line SL3. The fourth transistor T4 may be turned on in response to the third scan signal GI of the third scan line SL3. When the fourth transistor T4 is turned on, the initialization voltage VAINT may be transmitted to the anode electrode of the light emitting element LD.

The fifth transistor T5 may be electrically connected between the first power voltage VDD and the first transistor T1. A gate electrode of the fifth transistor T5 may be connected to the first light emitting control line ECL. The fifth transistor T5 may be turned on in response to the first light emitting control signal EM of the first light emitting control line ECL.

The sixth transistor T6 may be electrically connected between the second node N2 and the anode electrode of the light emitting element LD. A gate electrode of the sixth transistor T6 may be connected to the second light emitting control line EBL. The sixth transistor T6 may be turned on in response to the second light emitting control signal EMB of the second light emitting control line EBL.

When the fifth transistor T5 and the sixth transistor T6 are turned on, a current path through which a driving current may flow from the first power voltage VDD to the second power voltage VSS via the pixel circuit portion PXC, and the light emitting element LD may be powered.

The first capacitor Cst may be electrically connected between the first node N1 and the second node N2. A voltage corresponding to a voltage of the data signal Vdata may be stored in the first capacitor Cst.

The second capacitor Chold may be electrically connected between the first power voltage VDD and the second node N2. The second capacitor Chold may stabilize the voltage of the second node N2. In some embodiments, the second capacitor Chold may be electrically connected between a constant voltage terminal such as the reference voltage VREF and the second node N2.

A voltage level of the first power voltage VDD may be higher than a voltage level of the second power voltage VSS. A voltage level of the reference voltage VREF may be equal to or different from a voltage level of the first power voltage VDD. A voltage level of the initialization voltage VAINT may be lower than the voltage level of the first power voltage VDD and may be higher than the voltage level of the second power voltage VSS. Power voltages such as the first power voltage VDD, the second power voltage VSS, the reference voltage VREF, and the initialization voltage VAINT are not limited thereto, and voltage levels of the power voltages may be variously changed, for example, according to product specifications.

The light emitting element LD may be electrically connected between the sixth transistor T6 and the second power voltage VSS. When a driving current is supplied from the first transistor T1, the light emitting element LD may emit light with a luminance corresponding to the driving current. The light emitting element LD may include at least one organic light emitting diode or at least one inorganic light emitting diode. The type, size, and/or number of the light emitting elements LD may be changed depending on an embodiment.

The first to sixth transistors T1 to T6 included in the pixel circuit portion PXC may be N-type transistors, but are not limited thereto. For example, at least one of the first to sixth transistors T1 to T6 may be a P-type transistor. A voltage level of driving signals for controlling operation of a transistor may be set according to the type of each of the transistors T1 to T6.

In some embodiments, at least one of the first to sixth transistors T1 to T6 may include an oxide semiconductor. For example, at least one transistor including the third transistor T3 may be an oxide semiconductor transistor including an oxide semiconductor.

The pixel circuit portion PXC according to an embodiment shown in FIG. 2 is an example and is not limited thereto, and the number and connection relationship of the transistors T1 to T6 and the capacitors Cst and Chold included in the pixel circuit portion PXC may be variously changed.

An example connection relationship between a plurality of pixel circuit portions of a display device according to an embodiment and a data line and a first scan line will be described with reference to FIG. 3 together with FIG. 2.

Figure 3:
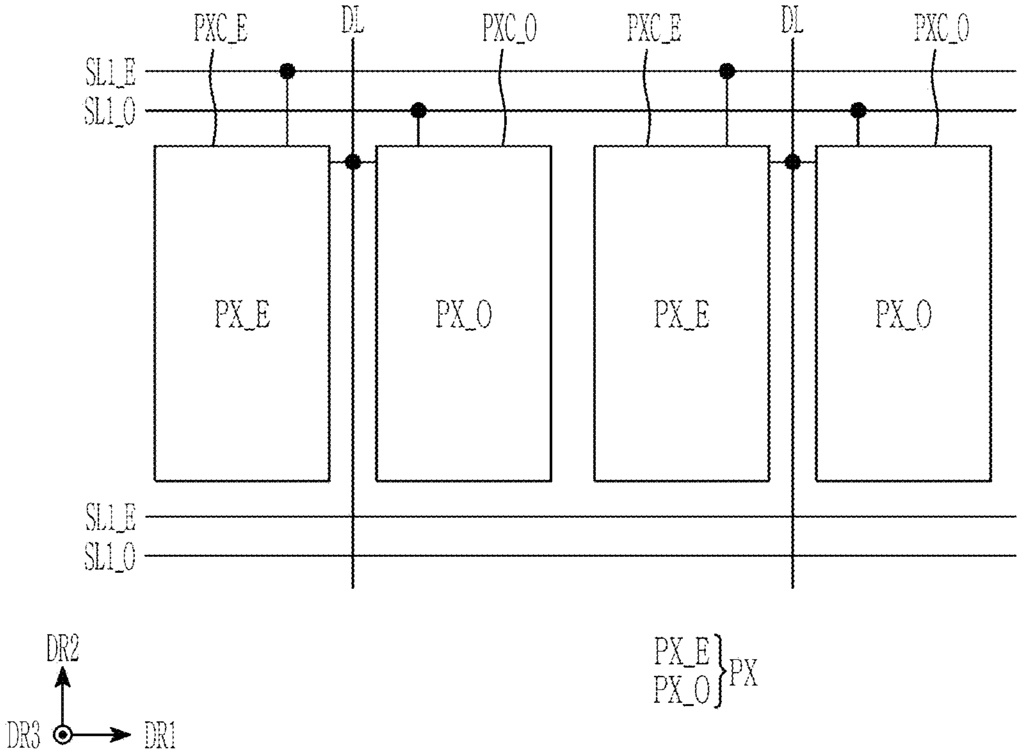
FIG. 3 is a schematic layout view of a connection relationship between a plurality of pixel circuit portions of a display device and a plurality of scan lines connected thereto according to an embodiment.

FIG. 3 is a schematic layout view of a connection relationship between a plurality of pixel circuit portions of a display device and a plurality of scan lines connected thereto according to an embodiment.

In pixels PX disposed in a pixel row among a plurality of pixels PX included in a display device according to an embodiment, pixel circuit portions PXC_O and PXC_E of a pair of adjacent pixels PX_O and PX_E may be connected while sharing a data line DL. The pixel circuit portions PXC_O and PXC_E of the pair of adjacent pixels PX_O and PX_E connected to a data line DL may be connected to different first scan lines SL1_O and SL1_EO and may receive the data signal of the data line DL at different times. The data lines DL may be disposed such that every two pixel rows may share a data line DL, but the disposition of data lines DL is not limited thereto.

The pixel PX that receives the first scan signal GW first among the pair of adjacent pixels PX_O and PX_E connected to a data line DL may be referred to as a first pixel PX_O, and the pixel PX that receives the first scan signal GW later may be referred to as a second pixel PX_E. The pixel circuit portion PXC_O of the first pixel PX_O may be connected to the first scan line SL1_O, and the pixel circuit portion PXC_E of the second pixel PX_E may be connected to the first scan line SL1_E. The first scan line SL1_O and the first scan line SL1_E may be disposed adjacent to each other. The first scan line SL1_O and the first scan line SL1_E may be disposed as a pair, and the first scan line SL1_O and the first scan line SL1_E disposed as a pair may be repeatedly disposed for each pixel row. The first scan signal GW may be scanned in the second direction DR2 in FIG. 3 and may be sequentially transmitted to the first scan lines SL1_O and SL1_E arranged in rows.

The structures of the two pixel circuit portions PXC_O and PXC_E connected to a data line DL and disposed on both sides of the data line DL in an embodiment shown in FIG. 3 may be symmetrical to each other based on the data line DL.

A driving signal applied to a pixel of a display device according to an embodiment will be described with reference to FIG. 4 together with the drawings described herein.

Figure 4:
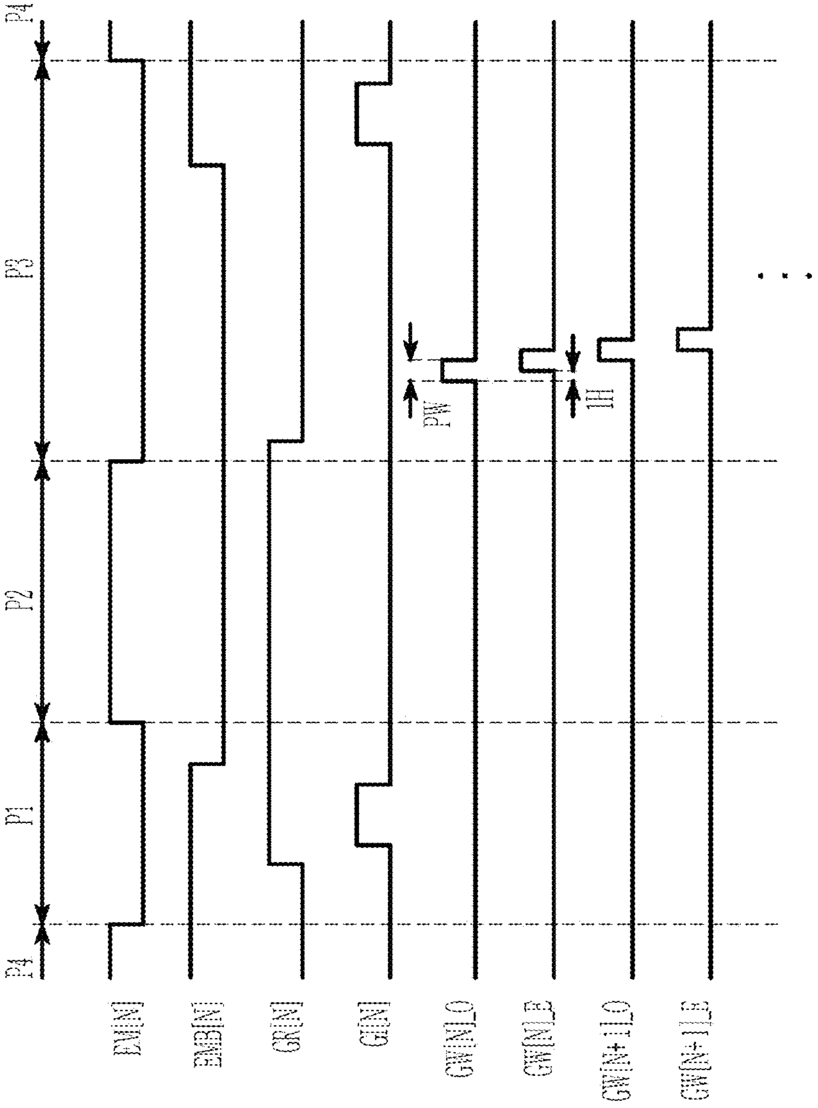
FIG. 4 is a waveform diagram of a scan signal and a light emitting control signal applied to a pixel circuit portion of a display device according to an embodiment.

FIG. 4 is a waveform diagram of a scan signal and a light emitting control signal that may be applied to a pixel circuit portion of a display device according to an embodiment.

Referring to FIG. 2 to FIG. 4, a frame (or a frame period in which a frame image is displayed) may include a first period P1, a second period P2, a third period P3, and a fourth period P4 sequential in time. When the pixel PX is disposed in an N-th pixel row, a first light emitting control signal EM[N], a second light emitting control signal EMB[N], a first scan signal GW[N]O or GW[N]_E, a second scan signal GR[N], and a third scan signal GI[N] may be applied to the pixel PX. N may be a positive integer, and "[N]" may mean N-th. For example, "EM[N]" may mean a first light emitting control signal provided to the pixel PX of the N-th pixel row. The first scan signal GW[N]_O may be a signal transmitted to the first scan line SL1_O described herein, and the first scan signal GW[N]_E may be a signal transmitted to the first scan line SL1_E described herein.

The first light emitting control signal EM[N] may have a turn-off voltage level (or a gate-off voltage level, a low level) in the first period P1 and the third period P3, and may have a turn-on voltage level (or a gate-on voltage level, a high level) in the second period P2 and the fourth period P4.

The second light emitting control signal EMB[N] may have a turn-off voltage level in the second period P2 and a front portion of the third period P3, and may have a turn-on voltage level in the first period P1, a rear portion of the third period P3, and the fourth period P4. The first period P1, the second period P2, the third period P3, and the fourth period P4 may be divided based on the first light emitting control signal EM[N] and the second light emitting control signal EMB[N]. Herein, the front portion may be an early portion in time and the rear portion may be a later portion in time.

In the first period P1, the fifth transistor T5 may be turned off in response to the first light emitting control signal EM[N] at a turn-off voltage level, and the sixth transistor T6 may be turned on in response to the second light emitting control signal EMB[N] at a turn-on voltage level, and the second node N2 may be electrically connected to the anode electrode of the light emitting element LD. The current path may be blocked in the first period P1, and the light emitting element LD may not emit light.

In the first period P1, the second scan signal GR[N] may have a turn-on voltage level. In this case, the third transistor T3 is turned on, and the first node N1 (or the gate electrode of the first transistor T1) may be initialized by the reference voltage VREF. In the first period P1, the third scan signal GI[N] may have a turn-on voltage level. In this case, the fourth transistor T4 is turned on, and the anode electrode of the light emitting element LD may be initialized by the initialization voltage VAINT. In addition, in a case that the second node N2 and the anode electrode of the light emitting element LD are electrically connected by the sixth transistor T6, the second node N2 (or the first capacitor Cst) may be initialized by the initialization voltage VAINT. That is, the pixel PX may be initialized in the first period P1.

In the first period P1, the application timing of the second scan signal GR[N] at the turn-on voltage level may be earlier than the application timing of the third scan signal GI[N] at the turn-on voltage level, but the present disclosure is not limited thereto.

The first scan signal GW[N]_O or GW[N]_E may have a turn-off voltage level in the first period P1 and the second period P2.

In the second period P2, the second scan signal GR[N] may have a turn-on voltage level. When the reference voltage VREF is set to be at a level greater than the initialization voltage VAINT (or a voltage corresponding to the sum of the initialization voltage VAINT and the threshold voltage of the first transistor T1), the first transistor T1 may maintain a turned-on state.

In the second period P2, the third scan signal GI[N] may have a turn-off voltage level. In this case, the fourth transistor T4 may be turned off.

The fifth transistor T5 may be turned on in response to the first light emitting control signal EM[N] at the turn-on voltage level. In this case, the voltage of the second node N2 may be changed by the driving current flowing through the first transistor T1. For example, the voltage of the second node N2 may be changed to a value obtained by subtracting the threshold voltage of the first transistor T1 from the voltage of the first node N1 (that is, the reference voltage VREF). Accordingly, the voltage corresponding to the threshold voltage of the first transistor T1 may be stored in the first capacitor Cst. That is, the threshold voltage of the first transistor T1 may be compensated in the second period P2.

In the third period P3, the second scan signal GR[N] may have a turn-off voltage level. In the third period P3, the second scan signal GR[N] may transition from a turn-on voltage level to a turn-off voltage level, but the present disclosure is not limited thereto. In the third period P3, the first scan signal GW[N]_O or GW[N]_E may have a turn-on voltage level. In this case, the second transistor T2 may be turned on, and the data signal Vdata may be transmitted to the first node N1. That is, the data signal Vdata (or a voltage corresponding to the data signal Vdata) may be transmitted to the pixel PX (or the first capacitor Cst).

In the third period P3, after the first scan signal GW[N]_O or GW[N]_E transitions to have a turn-off voltage level, the third scan signal GI[N] and the second light emitting control signal EMB[N] may transition to have a turn-on voltage level. In this case, the second node N2, which may be changed during the writing process of the data signal Vdata, may be initialized a subsequent time by the initialization voltage VAINT. In addition, the anode electrode of the light emitting element LD may be initialized a subsequent time by the initialization voltage VAINT. That is, in the third period P3, the data signal Vdata may be transmitted to the pixel PX, and the pixel PX may emit light corresponding to the data signal Vdata.

In some embodiments, in the third period P3, the first scan signals GW[N]_O or GW[N]_E and GW[N+1]_O or GW[N+1]_E at the turn-on voltage level may be sequentially applied along the pixel row. The first scan signal GW[N]_O at the turn-on voltage level and applied to the N-th pixel row may partially overlap the first scan signal GW[N]_E at the turn-on voltage level. In addition, the first scan signal GW[N+1]_O at the turn-on voltage level and applied to the (N+1)-th pixel row may partially overlap the first scan signal GW[N+1]_E at the turn-on voltage level. The first scan signal GW[N]_E at the turn-on voltage level and applied to the N-th pixel row may partially overlap the first scan signal GW[N+1]_O applied to the (N+1)-th pixel row at the turn-on voltage level.

In some embodiments, in the third period P3, when the first scan signals GW[N]_O, GW[N]_E, GW[N+1]_O, and GW[N+1]_E at the turn-on voltage level are sequentially output or provided at 1 horizontal time (1H) intervals, the pulse width PW of the first scan signals GW[N]_O, GW[N]_E, GW[N+1]_O, and GW[N+1]_E at the turn-on voltage level may be greater than 1 horizontal time (1H). However, embodiments are not limited thereto. In addition, the time for the first scan signals GW[N]_O, GW[N]_E, and GW[N+1]_O at the turn-on voltage level to overlap the subsequent signal at the turn-on voltage level may be greater than or equal to 1 horizontal time (1H), but is not limited thereto. For example, the time for the first scan signal GW[N]_O at the turn-on voltage level to overlap the first scan signal GW[N]_E at the turn-on voltage level may be greater than or equal to 1 horizontal time (1H), the time for the first scan signal GW[N]_E at the turn-on voltage level to overlap the first scan signal GW[N+1]_O at the turn-on voltage level may be greater than or equal to 1 horizontal time (1H), and the time for the first scan signal GW[N+1]_O at the turn-on voltage level to overlap the first scan signal GW[N+1]_E at the turn-on voltage level may be greater than or equal to 1 horizontal time (1H).

In the fourth period P4, each of the first scan signal GW[N]_O or GW[N]_E, the second scan signal GR[N], and the third scan signal GI[N] may have a turn-off voltage level. In the fourth period P4, the fifth transistor T5 may be turned on in response to the first light emitting control signal EM[N] at the turn-on voltage level, and the sixth transistor T6 may be turned on in response to the second light emitting control signal EMB[N] at the turn-on voltage level. In this case, a current path may be formed between the first power voltage VDD and the second power voltage VSS, the first transistor T1 supplies a driving current corresponding to the voltage stored in the first capacitor Cst to the light emitting element LD, and the light emitting element LD may emit light with a luminance corresponding to the driving current.

A kickback effect between two adjacent pixels of a display device according to an embodiment will be described with reference to FIG. 5 to FIG. 7 together with the drawings described herein.

Figure 5:
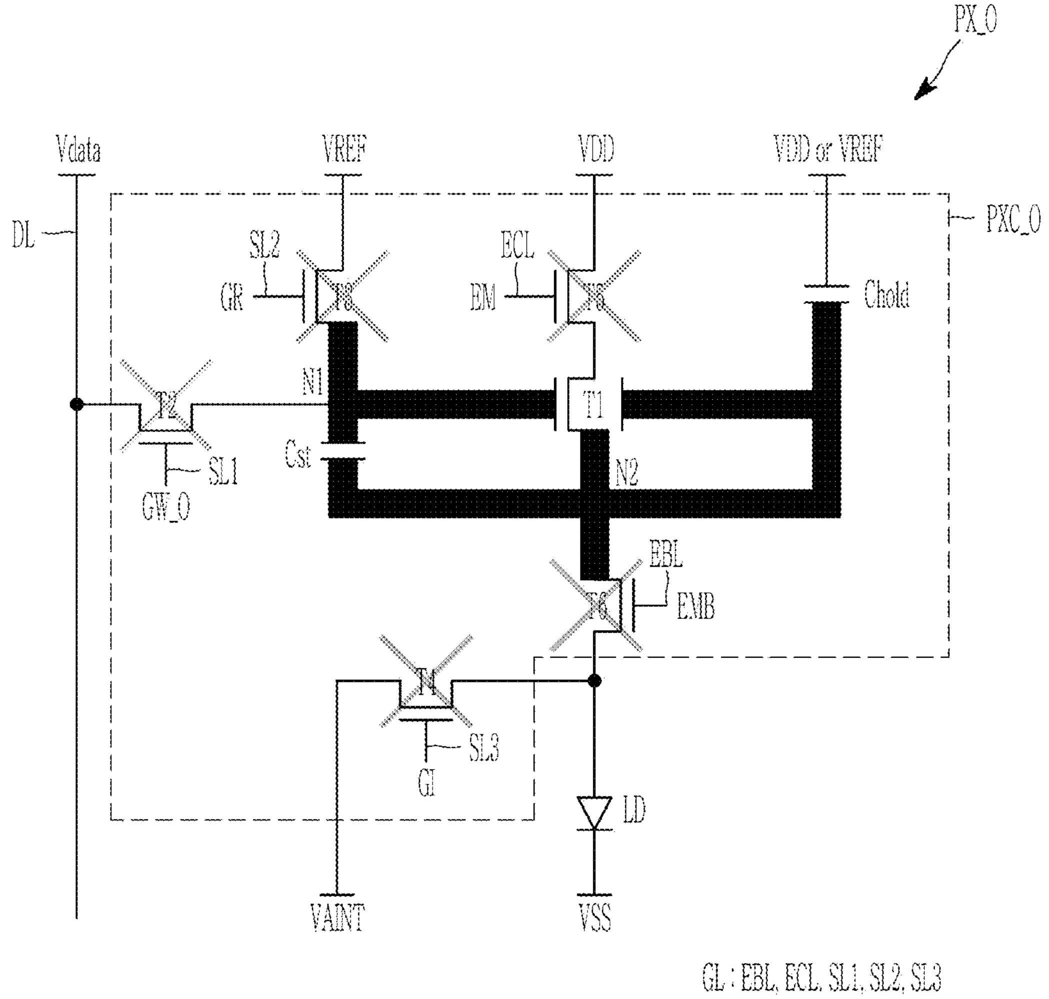
FIG. 5 is a circuit diagram of an operation state of a pixel circuit portion of an adjacent first pixel when a first scan signal is applied to a second pixel of a display device according to an embodiment.

FIG. 5 is a circuit diagram of an operation state of a pixel circuit portion PXC_O of an adjacent first pixel PX_O when a first scan signal GW_E is applied to a second pixel PX_E of a display device according to an embodiment. FIG. 6 is a circuit diagram of an operation state of a pixel circuit portion PXC_E of a second pixel PX_E when the first scan signal GW_E is applied to the second pixel PX_E of a display device according to an embodiment. FIG. 7 is a waveform diagram of a kickback effect that occurs according to a change in a voltage level of a first scan signal GW_O or GW_E applied to the adjacent pixels PX_O and PX_E of a display device according to an embodiment.

Figure 6:
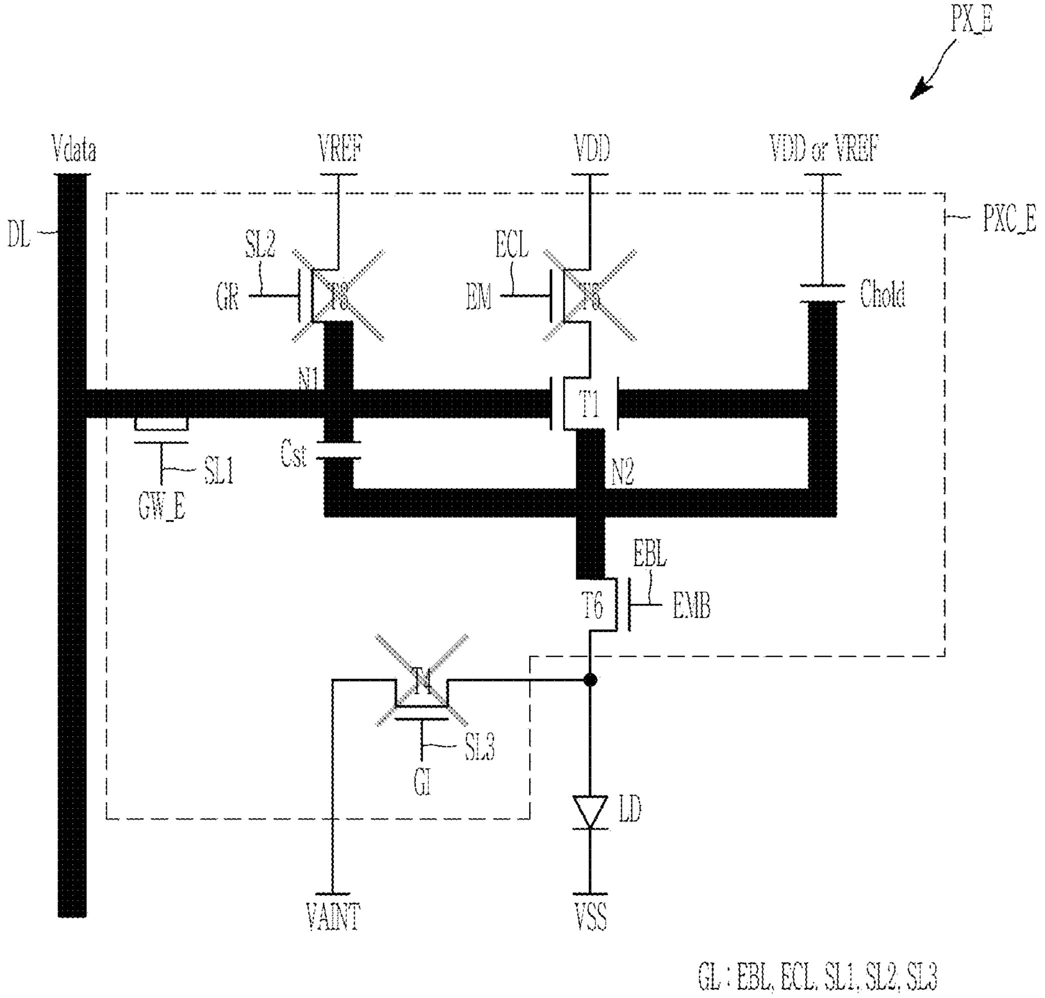
FIG. 6 is a circuit diagram of an operation state of a pixel circuit portion of a second pixel when a first scan signal is applied to the second pixel of a display device according to an embodiment.
Figure 7:
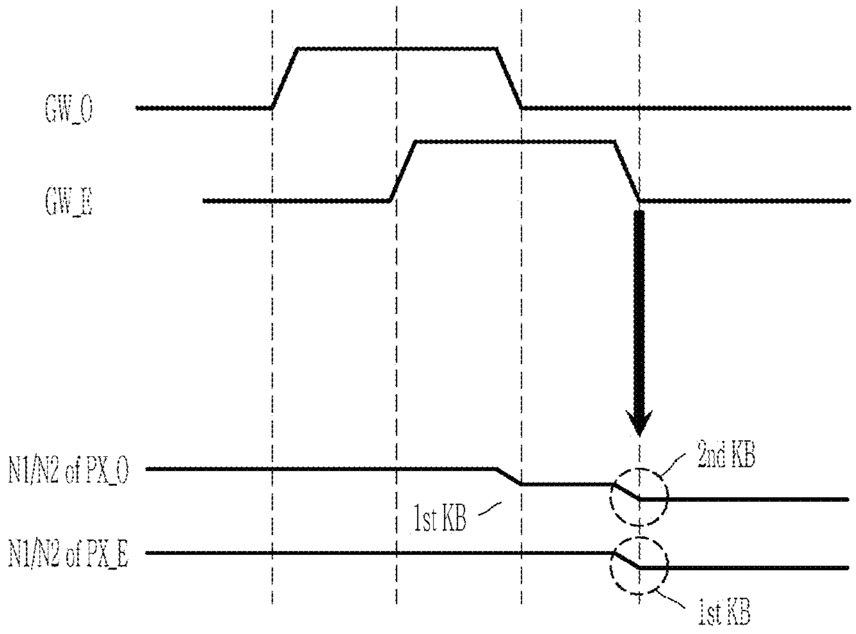
FIG. 7 is a waveform diagram of a kickback effect caused by a change in a voltage level of a first scan signal applied to two adjacent pixels of a display device according to an embodiment.

Referring to FIG. 5 to FIG. 7 together with FIG. 2 to FIG. 4, in the third period P3, when the first scan signal GW_O applied to the pixel circuit portion PXC_O of the first pixel PX_O is at the turn-on voltage level, the data signal Vdata may be transmitted to the first node N1 of the first pixel PX_O. When the first scan signal GW_O transitions (or is changed) to the turn-off voltage level, the voltage of the first node N1 and/or the second node N2 of the first pixel PX_O may be affected by a primary kickback (1st KB) in which the voltage is dropped by the parasitic capacitance with the adjacent first scan line SL1_O. When the first scan signal GW_O transitions to the turn-off voltage level, the first node N1 (or the gate electrode of the first transistor T1) of the first pixel PX_O is in a floating state as shown in FIG. 5. When the first scan signal GW_E applied to the second pixel PX_E overlapping the turn-on voltage level of the first scan signal GW_O is at the turn-on voltage level, as shown in FIG. 6, in the turned-on state of the second transistor T2 of the second pixel PX_E, the data signal Vdata may be transmitted to the first node N1 of the second pixel PX_E.

Referring to FIG. 7, when the first scan signal GW_E applied to the second pixel PX_E transitions to the turn-off voltage level, the voltage of the first node N1 and/or the second node N2 of the first pixel PX_O in a floating state may be affected by a secondary kickback (2nd KB) in which the voltage may be dropped a subsequent time by a parasitic capacitance with the adjacent first scan line SL1_E. In this case, the voltage of the first node N1 and/or the second node N2 of the second pixel PX_E may also be affected by the primary kickback (1st KB) in which the voltage is dropped by a parasitic capacitance with the first scan line SL1_E.

Accordingly, a deviation may occur in a resulting level of the voltage of the first node N1 and/or the second node N2 of the first pixel PX_O connected to a data line DL and the voltage of the first node N1 and/or the second node N2 of the second pixel PX_E, so that a deviation may occur in the driving current and luminance of the light emitting element LD, which may cause a stain on the image. However, according to an embodiment to be described later, the magnitudes of the primary kickback and the secondary kickback affecting the first pixel PX_O and the magnitude of the primary kickback affecting the second pixel PX_E may be matched to each other, which may reduce display defects such as the deviation of driving current and luminance, and image stains of the light emitting element.

A detailed structure of a display device according to an embodiment will be described with reference to FIG. 8 to FIG. 18 together with the drawings described herein.

FIG. 8, FIG. 10, FIG. 12, FIG. 15, and FIG. 17 are top plan views of a display device according to some embodiments. FIG. 8, FIG. 10, FIG. 12, FIG. 15, and FIG. 17 may show sequential stacking steps of a method of manufacturing a display device according to an embodiment. FIG. 9 is a cross-sectional view taken along line A1-A2 and line A2-A3 of the display device shown in FIG. 8. FIG. 11 is a cross-sectional view taken along line A1-A2 and line A2-A3 of the display device shown in FIG. 10. FIG. 13 and FIG. 14 are cross-sectional views taken along line A1-A2 and line A2-A3 of the display device shown in FIG. 12, respectively. FIG. 16 is a cross-sectional view taken along line A1-A2 and line A2-A3 of the display device shown in FIG. 15. FIG. 18 is a cross-sectional view taken along line A1-A2 and line A2-A3 of the display device shown in FIG. 17.

To facilitate understanding and ease of description, the layers stacked on the substrate will be described in a stacked order. FIG. 8, FIG. 10, FIG. 12, FIG. 15, and FIG. 17 illustrate pixel circuit portions of adjacent pixels PX_E and PX_O connected to a data line among the plurality of pixels PX included in the display device according to an embodiment. The pixel circuit portions of the two pixels PX_E and PX_O adjacent to each other in the first direction DR1 may be symmetrical to each other in the first direction DR1, but is not limited thereto. For example, the two pixels PX_E and PX_O may include one or more asymmetrical features without departing from the spirit or scope of the present disclosure. The two pixels PX_E and PX_O may include a first pixel PX_O and a second pixel PX_E.

Figure 8:
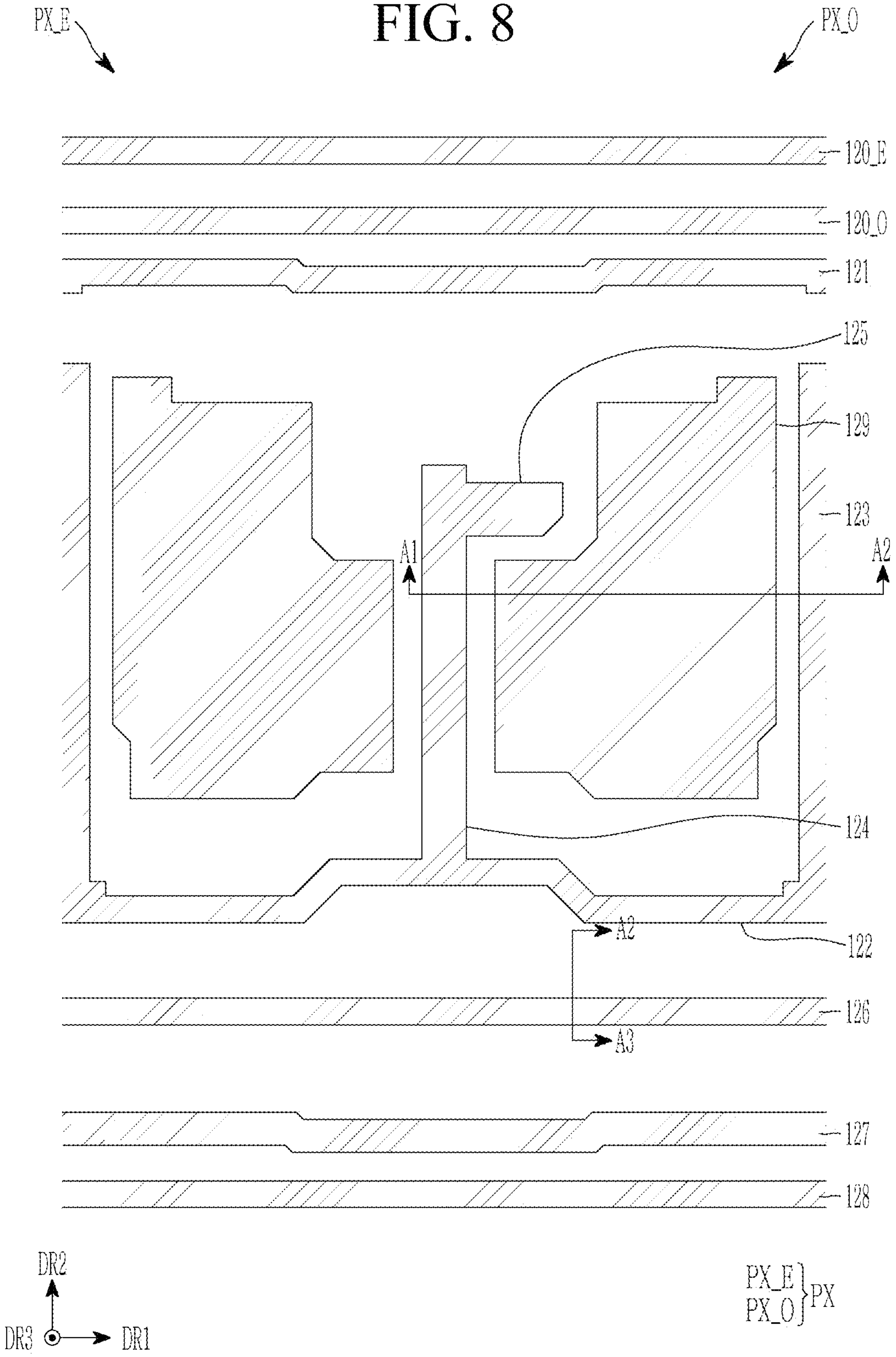
FIG. 8, FIG. 10, FIG. 12, FIG. 15, and FIG. 17 are top plan views of sequential stacking steps of a method of manufacturing a display device according to an embodiment.
Figure 9:
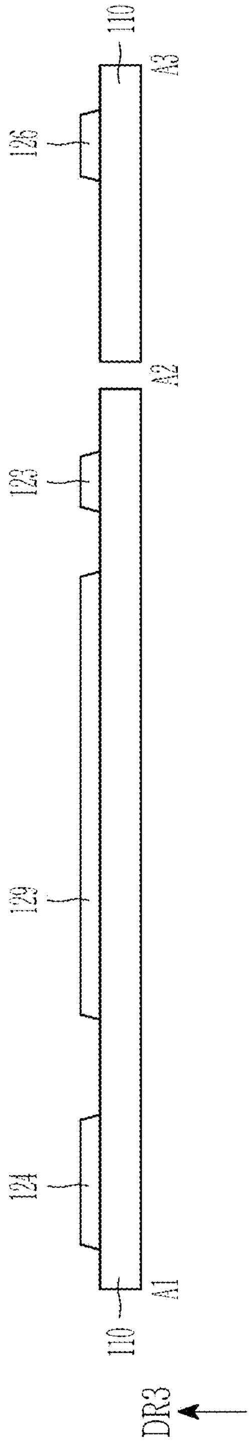
FIG. 9 is a cross-sectional view taken along line A1-A2 and line A2-A3 of the display device shown in FIG. 8.

FIG. 8 and FIG. 9 illustrate a first conductive layer disposed on the substrate included in the display device according to an embodiment.

The display device according to an embodiment may include a substrate 110. The substrate 110 may include an insulating material and may include glass, or plastic. The substrate 110 may include a material that has a rigid characteristic such as glass, which may be a rigid material that does not bend, or may include a flexible material such as plastic or polyimide that may be bent.

A first conductive layer may be disposed on the substrate 110. The first conductive layer may include a pair of first scan lines 120_E and 120_O adjacent to each other and extending in the second direction DR2, a reference voltage line 121, a first power line 122, a second power line 126, at least one initialization voltage line 127 or 128, and a lower electrode 129.

Each of the pair of first scan lines 120_E and 120_O may transmit the first scan signals GW_E and GW_O, the reference voltage line 121 may transmit the reference voltage VREF, the first power line 122 may transmit the first power voltage VDD, the second power line 126 may transmit the second power voltage VSS, and the at least one initialization voltage line 127 or 128 may transmit at least one initialization voltage VAINT. In an embodiment, the pair of initialization voltage lines 127 and 128 may be disposed in a pixel row is described, but the present disclosure is not limited thereto. The initialization voltages VAINT transmitted by the pair of initialization voltage lines 127 and 128 may be the same or different from each other.

The first scan line 120_E or 120_O, the reference voltage line 121, the first power line 122, the second power line 126, and the at least one initialization voltage line 127 or 128 may include a portion extending in the first direction DR1, and may extend along the plurality of pixels PX of the corresponding pixel row and may be connected to the plurality of pixels PX. The lower electrode 129 may have an island shape disconnected from other portions of the first conductive layer. The lower electrode 129 may be disposed within each of the pixels PX_E and PX_O. The lower electrode 129 may be disposed entirely within each of the pixels PX_E and PX_O. The lower electrode 129 may be disposed between the reference voltage line 121 and the first power line 122 spaced apart from each other, but is not limited thereto.

The first conductive layer may include portions forming the reference voltage line 121, the first power line 122, the second power line 126, and the initialization voltage lines 127 and 128. One or more of the voltage lines may include a shielding pattern 124 disposed between the two adjacent pixels PX_E and PX_O. That is, the first conductive layer may include a shielding pattern 124. In an embodiment, the shielding pattern 124 may extend from the first power line 122 will be mainly described. However, in some embodiments, the shielding pattern 124 may extend downward (in a direction opposite to the second direction DR2) from the reference voltage line 121 or another conductive layer electrically connected to the reference voltage line 121, or may extend from the second power line 126 or another conductive layer electrically connected to the second power line 126, or may extend from the initialization voltage lines 127 and 128 or another conductive layer electrically connected to the initialization voltage lines 127 and 128.

The shielding pattern 124 may extend in the second direction DR2. The shielding pattern 124 may be disposed between two lower electrodes 129 disposed in two adjacent pixels PX_E and PX_O, respectively. Accordingly, the shielding patterns 124 may be arranged with the lower electrode 129 in the first direction DR1.

The shielding pattern 124 according to an embodiment may include an asymmetrical portion. The asymmetrical portion of the shielding pattern 124 may be disposed asymmetrically in at least the first direction DR1. For example, the asymmetrical portion of the shielding pattern 124 may have a greater area in a plan view on a side facing the first pixel PX_O than on a side facing the second pixel PX_E. For example, the asymmetrical portion of the shielding pattern 124 may extend in a plan view only on a side facing the first pixel PX_O and may be omitted on a side facing the second pixel PX_E.

The shielding pattern 124 according to an embodiment the asymmetrical portion may be a wing portion 125. The wing portion 125 may have a shape protruding laterally from a portion of the shielding pattern 124 extending in the second direction DR2. The wing portion 125 may protrude toward the first pixel PX_O. The wing portion 125 may not protrude toward the second pixel PX_E. The wing portion 125 may be disposed on the same conductive layer as the shielding pattern 124 or may be disposed on a different conductive layer. For example, the wing portion 125 may extend parallel to the first direction DR1 or may also extend in a direction oblique to the second direction DR2 and the first direction DR1, but is not limited thereto.

A width of the shielding pattern 124 extending in the second direction DR2 and a width of the wing portion 125 may be the same as or different from each other.

On the opposite side of the wing portion 125 based on the shielding pattern 124, a conductive layer symmetrical to the wing portion 125 may not be disposed between the lower electrode 129 of the second pixel PX_E and the shielding pattern 124. That is, the pixel circuit portion of the first pixel PX_O and the pixel circuit portion of the second pixel PX_E have a symmetrical portion to each other in the first direction DR1, and a pattern of the conductive layer forming the wing portion 125 that may be an asymmetrical portion, such that the pattern of the conductive layer may not be disposed in an area of the second pixel PX_E corresponding to the wing portion 125 of the first pixel PX_O. The shielding pattern 124 may be asymmetrical in the first direction DR1 in a case that the wing portion 125 protrudes only toward the first pixel PX_O.

The first power line 122 may further include a plurality of vertical portions 123 protruding in the second direction DR2. The vertical portion 123 may be disposed between a first pair of pixels PX_E and PX_O and a second pair of adjacent pixels PX_E and PX_O. For example, the plurality of vertical portions 123 may be disposed between adjacent pairs of the of adjacent pixels PX_E and PX_O. The vertical portion 123 may face the shielding pattern 124 with the lower electrode 129 interposed therebetween. A length of the vertical portion 123 in the second direction DR2 may be longer than a length of the shielding pattern 124 in the second direction DR2, but is not limited thereto. When reference is made to the first power line 122, it may refer to a portion substantially extending in the first direction DR1, and may not refer to the vertical portion 123.

The first conductive layer may include a metal such as copper (Cu), molybdenum (Mo), aluminum (Al), or titanium (Ti), or a metal alloy thereof. The first conductive layer may be configured of a single layer or multiple layers depending on embodiments.

Figure 10:
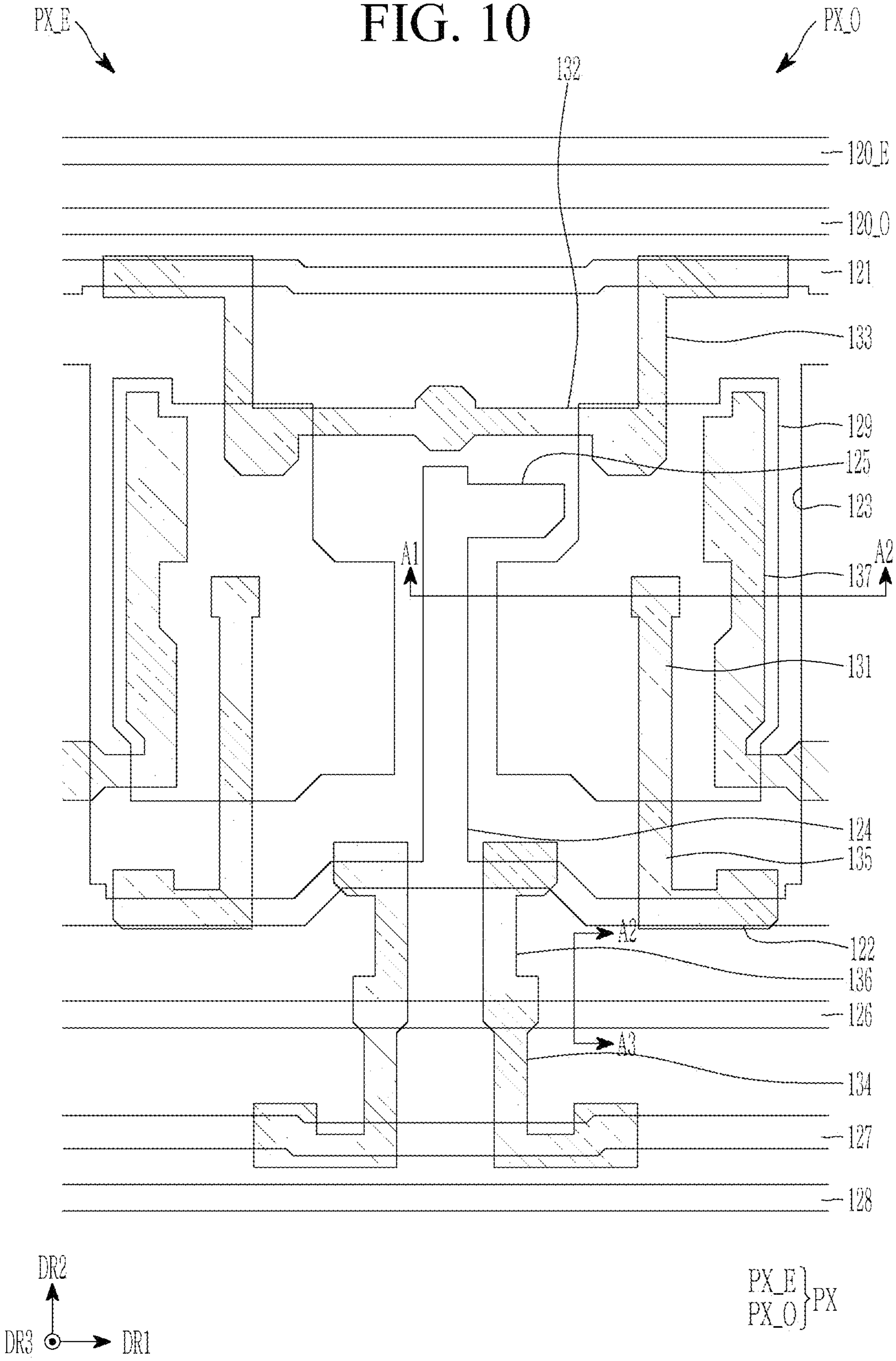
Figure 11:
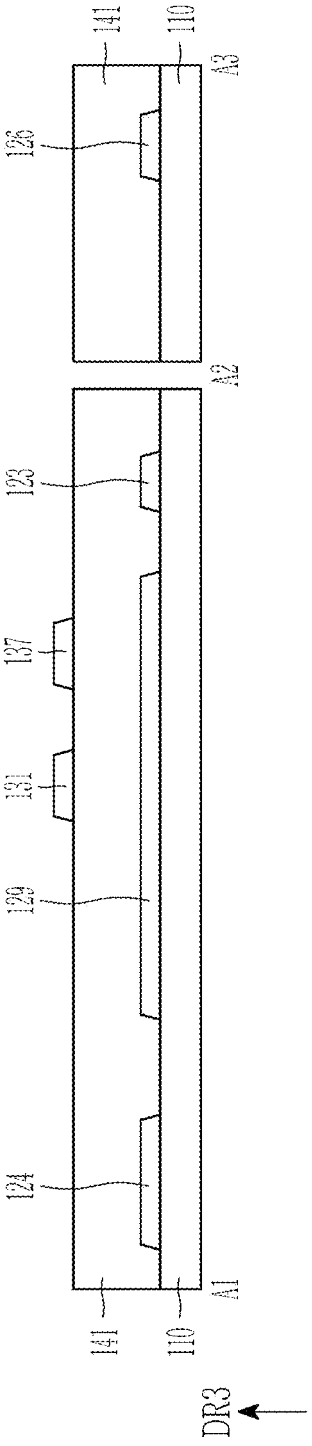
FIG. 11 is a cross-sectional view taken along line A1-A2 and line A2-A3 of the display device shown in FIG. 10.

FIG. 10 and FIG. 11 further illustrate a semiconductor layer disposed on a first conductive layer of a display device according to an embodiment.

Referring to FIG. 11, a first insulating layer 141 may be disposed on the substrate 110 and the first conductive layer. The first insulating layer 141 may include an inorganic insulating material such as silicon oxide (SiOx) or silicon nitride (SiNx).

A semiconductor layer may be disposed on the first insulating layer 141. The semiconductor layer may include a semiconductor material such as amorphous silicon, polycrystalline silicon, or an oxide semiconductor.

Referring to FIG. 10, the semiconductor layer may include a plurality of semiconductor patterns disposed in each of the pixels PX_E and PX_O. The plurality of semiconductor patterns may include a first semiconductor pattern 131, a second semiconductor pattern 132, a third semiconductor pattern 133, a fourth semiconductor pattern 134, a fifth semiconductor pattern 135, a sixth semiconductor pattern 136, and a seventh semiconductor pattern 137.

The first semiconductor pattern 131, the third semiconductor pattern 133, the fourth semiconductor pattern 134, and the sixth semiconductor pattern 136 may have an island shape formed to be limited to each of the pixels PX_E and PX_O. The second semiconductor pattern 132 may be disposed in two pixels PX_E and PX_O adjacent to each other and having the shielding pattern 124 interposed therebetween. The second semiconductor pattern 132 may have an island shape formed across the two pixels PX_E and PX_O. The seventh semiconductor pattern 137 may be disposed in two pixels PX_E and PX_O adjacent to each other and without the shielding pattern 124 therebetween. The seventh semiconductor pattern 137 may have an island shape formed across the two pixels PX_E and PX_O.

The second semiconductor pattern 132 and the third semiconductor pattern 133 respectively disposed in the pixels PX_E and PX_O may be connected to each other. The fourth semiconductor pattern 134 and the sixth semiconductor pattern 136 disposed in the pixels PX_E and PX_O may be connected to each other. The first semiconductor pattern 131 and the fifth semiconductor pattern 135 disposed in the pixels PX_E and PX_O, respectively, may be connected to each other.

At least some of the first semiconductor pattern 131, the second semiconductor pattern 132 or the third semiconductor pattern 133, and the seventh semiconductor pattern 137 may overlap the lower electrode 129 in a plan view. In the present disclosure, overlapping in a plan view may mean overlapping when viewed from a direction parallel to the third direction DR3. A portion of the seventh semiconductor pattern 137 disposed in an area overlapping the lower electrode 129 may be larger than a portion of the seventh semiconductor pattern 137 not overlapping the lower electrode 129.

The third semiconductor pattern 133 may overlap the reference voltage line 121 in a plan view. The sixth semiconductor pattern 136 may overlap the first power line 122 in a plan view. The sixth semiconductor pattern 136 or the fourth semiconductor pattern 134 may overlap the second power line 126 in a plan view. The fourth semiconductor pattern 134 may overlap the initialization voltage line 127 in a plan view.

The shapes of the plurality of semiconductor patterns 131, 132, 133, 134, 135, 136, and 137 are not limited to those shown in FIG. 10, and may be variously modified.

Figure 12:
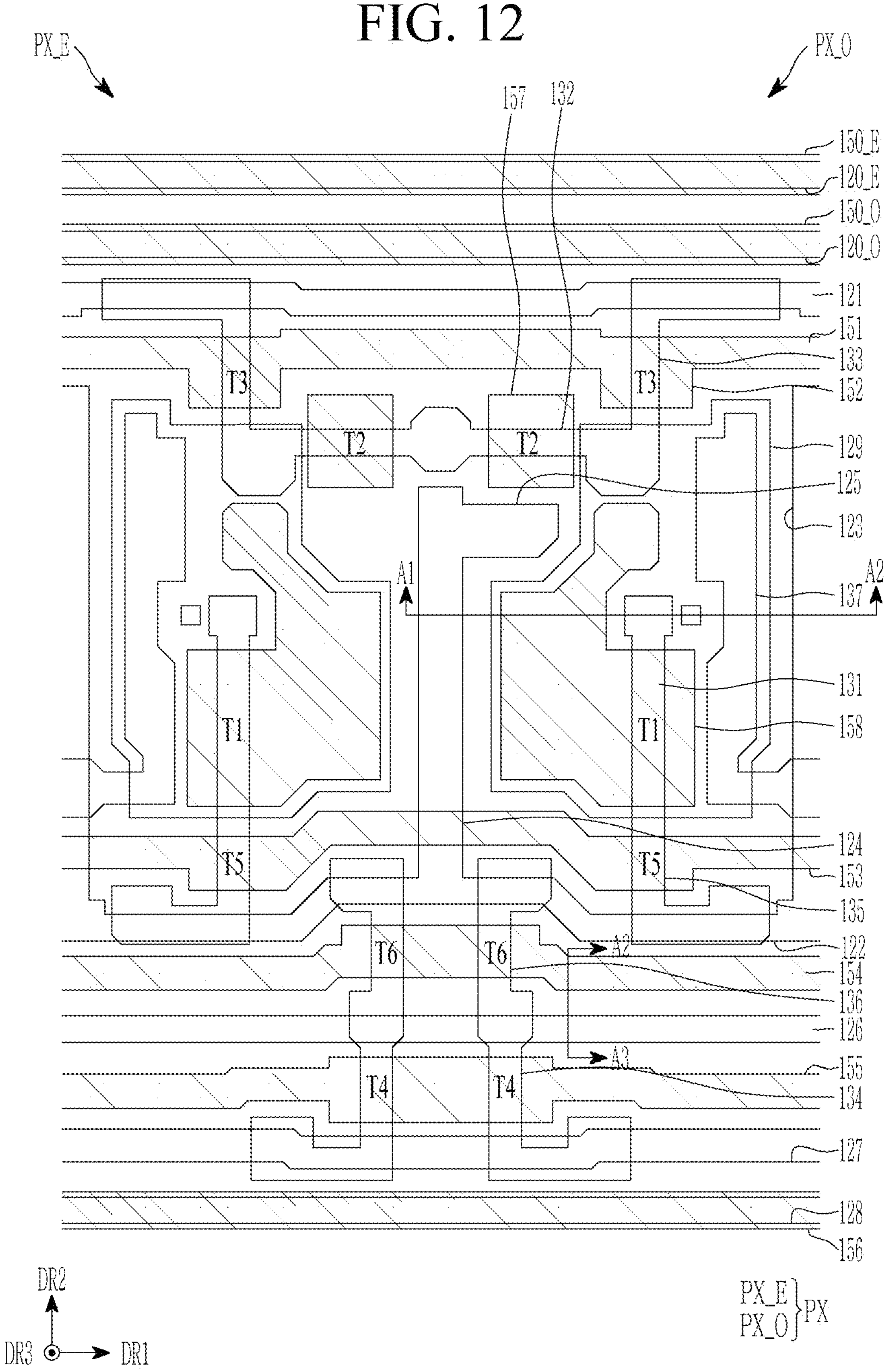
Figure 13:
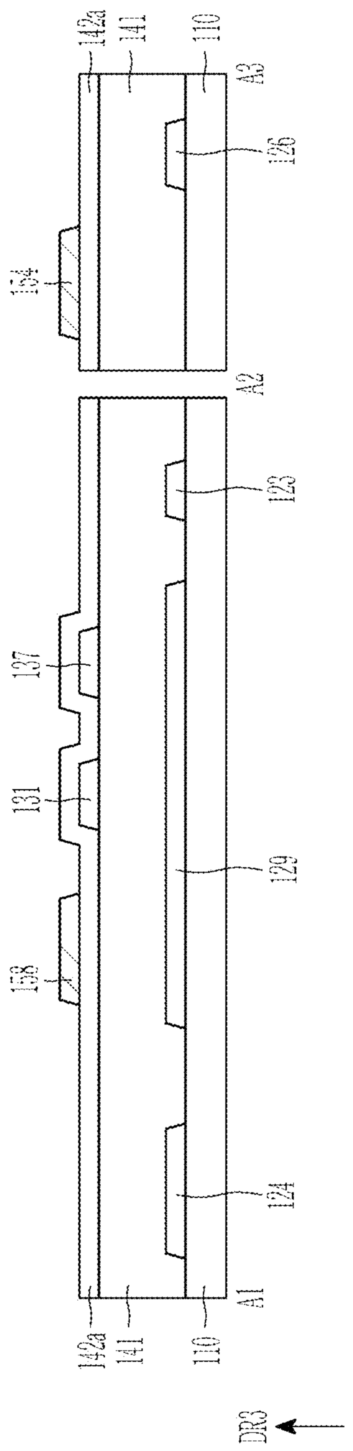
FIG. 13 and FIG. 14 are cross-sectional views taken along line A1-A2 and line A2-A3, respectively, of the display device shown in FIG. 12.
Figure 14:
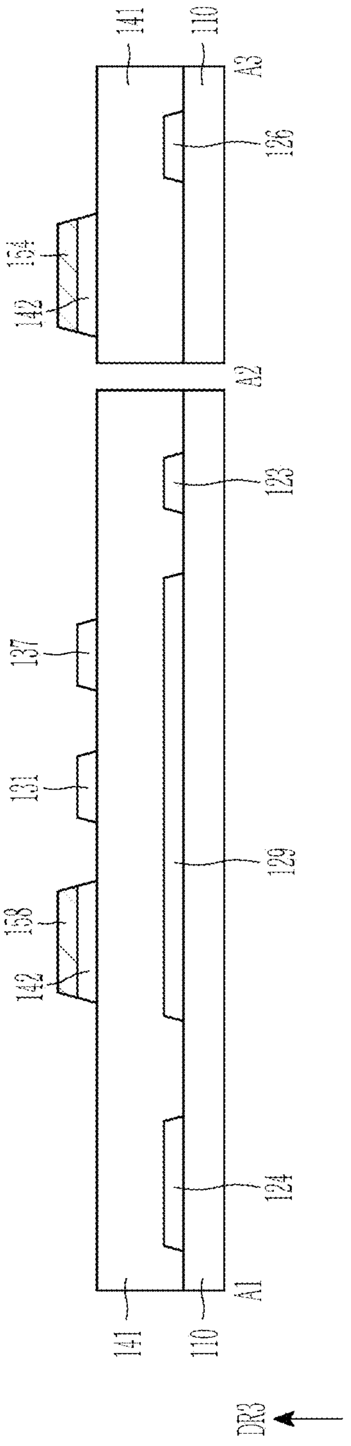

FIG. 12 to FIG. 14 further illustrate a second conductive layer disposed on the semiconductor layer.

Referring to FIG. 13 and FIG. 14, second insulating layers 142*a* and 142 may be disposed on the first insulating layer 141 and the semiconductor layer. The second insulating layers 142*a* and 142 may include an inorganic insulating material such as silicon oxide (SiOx) or silicon nitride (SiNx).

A second conductive layer may be disposed on the second insulating layers 142*a* and 142. The second conductive layer may include a pair of upper first scan lines 150_E and 150_O, a second scan line 151, a first light emitting control line 153, a second light emitting control line 154, a third scan line 155, an upper initialization voltage line 156, a gate electrode 157 of the second transistor T2, and a gate electrode 158 of the first transistor T1.

Each of the pair of upper first scan lines 150_E and 150_O may transmit the first scan signals GW_E and GW_O. The second scan line 151 may transmit the second scan signal GR. The first light emitting control line 153 may transmit the first light emitting control signal EM. The second light emitting control line 154 may transmit the second light emitting control signal EMB. The third scan line 155 may transmit the third scan signal GI. The upper initialization voltage line 156 may transmit the initialization voltage VAINT.

The upper first scan line 150_E may overlap the first scan line 120_E of the first conductive layer in a plan view and may extend long in the first direction DR1. The upper first scan line 150_E may be electrically connected to the first scan line 120_E in the display area. The upper first scan line 150_E may be electrically connected to the first scan line 120_E in the display area in the peripheral area.

The upper first scan line 150_O may overlap the first scan line 120_O of the first conductive layer in a plan view and may extend long in the first direction DR1. The upper first scan line 150_O may be electrically connected to the first scan line 120_O in the display area. The upper first scan line 150_O may be electrically connected to the first scan line 120_O in the peripheral area.

The upper initialization voltage line 156 may overlap the initialization voltage line 128 of the first conductive layer in a plan view and may extend long in the first direction DR1. The upper initialization voltage line 156 may be electrically connected to the initialization voltage line 128 of the first conductive layer in the display area. The upper initialization voltage line 156 may be electrically connected to the initialization voltage line 128 of the first conductive layer in the peripheral area.

Each of the upper first scan lines 150_E and 150_O, the second scan line 151, the first light emitting control line 153, the second light emitting control line 154, the third scan line 155, and the upper initialization voltage line 156 may extend along the plurality of pixels PX of the corresponding pixel row and may be connected to the plurality of pixels PX.

The second scan line 151 may include a portion intersecting the third semiconductor pattern 133. The second scan line 151 may further include a protrusion 152 overlapping the third semiconductor pattern 133. A portion of the second scan line 151 overlapping the third semiconductor pattern 133 and the protrusion 152 may form the gate electrode of the third transistor T3. The second scan line 151 may be disposed between the reference voltage line 121 and the lower electrode 129 in a plan view, but is not limited thereto.

The first light emitting control line 153 may intersect the fifth semiconductor pattern 135. The first light emitting control line 153 may include a portion extending more than other portions in an area intersecting the fifth semiconductor pattern 135. For example, the portion extending from the first light emitting control line 153 may extend in the downward direction (opposite to the second direction DR2). A portion of the first light emitting control line 153 overlapping the fifth semiconductor pattern 135 may form the gate electrode of the fifth transistor T5. The first light emitting control line 153 may be disposed between the lower electrode 129 and the first power line 122 in a plan view, but is not limited thereto.

The second light emitting control line 154 may intersect the sixth semiconductor pattern 136. The second light emitting control line 154 may include a portion extending more than other portions in an area intersecting the sixth semiconductor pattern 136. For example, the portion extending from the second light emitting control line 154 may extend in the upward direction (the second direction DR2). A portion of the second light emitting control line 154 overlapping the sixth semiconductor pattern 136 may form the gate electrode of the sixth transistor T6. The second light emitting control line 154 may be disposed between the first power line 122 and the second power line 126 in a plan view, but is not limited thereto.

The third scan line 155 may intersect the fourth semiconductor pattern 134. The third scan line 155 may include a portion extending more than other portions in an area intersecting the fourth semiconductor pattern 134. For example, the portion extending from the third scan line 155 may extend in the upward direction and/or the downward direction. A portion of the third scan line 155 overlapping the fourth semiconductor pattern 134 may form the gate electrode of the fourth transistor T4. The third scan line 155 may be disposed between the second power line 126 and the initialization voltage line 127 in a plan view, but is not limited thereto.

The gate electrode 157 of the second transistor T2 may have an island shape disposed within each of the pixels PX_E and PX_O. The gate electrode 157 of the second transistor T2 may have an island shape disposed entirely within each of the pixels PX_E and PX_O. In each of the pixels PX_E and PX_O, the gate electrode 157 of the second transistor T2 may be disposed between the second scan line 151 and the lower electrode 129 spaced apart from each other in a plan view and/or the gate electrode 158 of the first transistor T1. In addition, the gate electrode 157 of the second transistor T2 may be disposed between the second scan line 151 and the shielding pattern 124 in a plan view.

The gate electrode 158 of the first transistor T1 may have an island shape disposed to be limited to each of the pixels PX_E and PX_O. The gate electrode 158 of the first transistor T1 may overlap the lower electrode 129 in a plan view. The gate electrode 158 of the first transistor T1 may overlap the lower electrode 129 in a plan view. The entire gate electrode 158 of the first transistor T1 may overlap the lower electrode 129 in a plan view. The gate electrode 158 of the first transistor T1 may be spaced apart from and facing the seventh semiconductor pattern 137 on the lower electrode 129 in a plan view. In each of the pixels PX_E and PX_O, the gate electrode 158 of the first transistor T1 may be disposed between the second scan line 151 and the first light emitting control line 153 spaced apart from each other in a plan view.

The plurality of semiconductor patterns 131, 132, 133, 134, 135, 136, and 137 may include a conductive region and a semiconductor region with semiconductor properties—that is, a channel region. Among the plurality of semiconductor patterns 131, 132, 133, 134, 135, 136, and 137, overlapping the second conductive layer in a plan view, a portion overlapping the second conductive layer in a plan view may not be doped with impurities during the manufacturing process to form a channel region of each transistor, and the remaining region may be a conductive region doped with impurities during the manufacturing process. Particularly, the conductive region adjacent to the channel region of each transistor may form the source region or drain region of the corresponding transistor, and the source region or drain region may form the first electrode or the second electrode described herein or may be electrically connected to the first electrode or the second electrode.

Referring to FIG. 12, the seventh semiconductor pattern 137 does not overlap the second conductive layer in a plan view, so it may have conductivity overall.

The second conductive layer may include a metal such as copper (Cu), molybdenum (Mo), aluminum (Al), silver (Ag), chromium (Cr), tantalum (Ta), or titanium (Ti), or a metal alloy. The second conductive layer may be configured as a single layer or multiple layers.

Referring to FIG. 13, the second insulating layer **142*a* according to an embodiment may be formed on a surface of the substrate 110. The second insulating layer 142*a* according to an embodiment may be formed on the entire surface of the substrate 110, and the second insulating layer 142 according to an embodiment may be patterned to be disposed only between the second conductive layer and the first insulating layer 141. According to an embodiment shown in FIG. 14, in the manufacturing process of the display device, the second insulating layer 142*a* may be etched using the pattern of the second conductive layer formed on the second insulating layer 142*a* formed as shown in FIG. 13 as a mask to form the second insulating layer 142 aligned with the pattern of the second conductive layer as shown in FIG. 14**.

Figure 15:
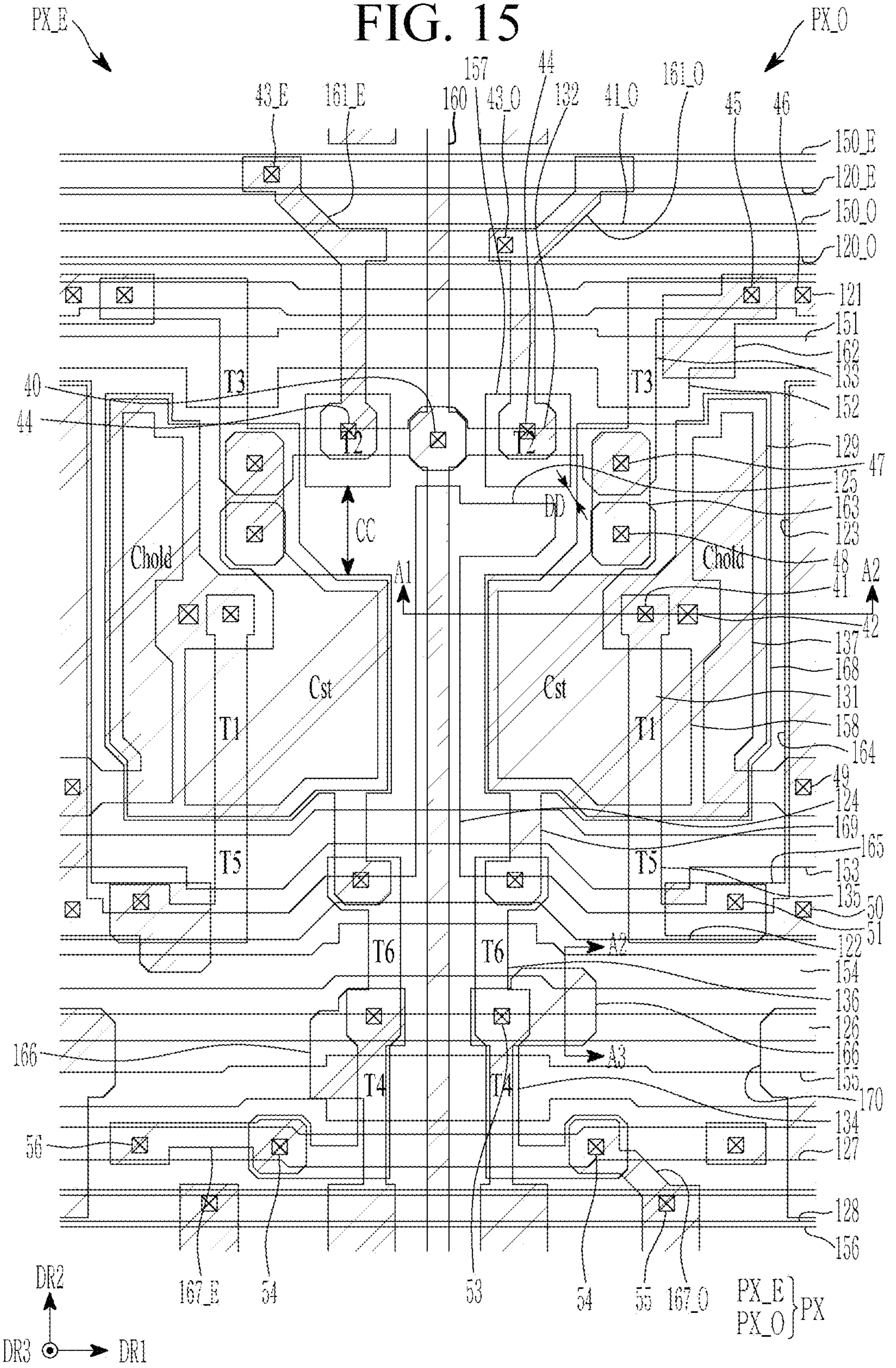
Figure 16:
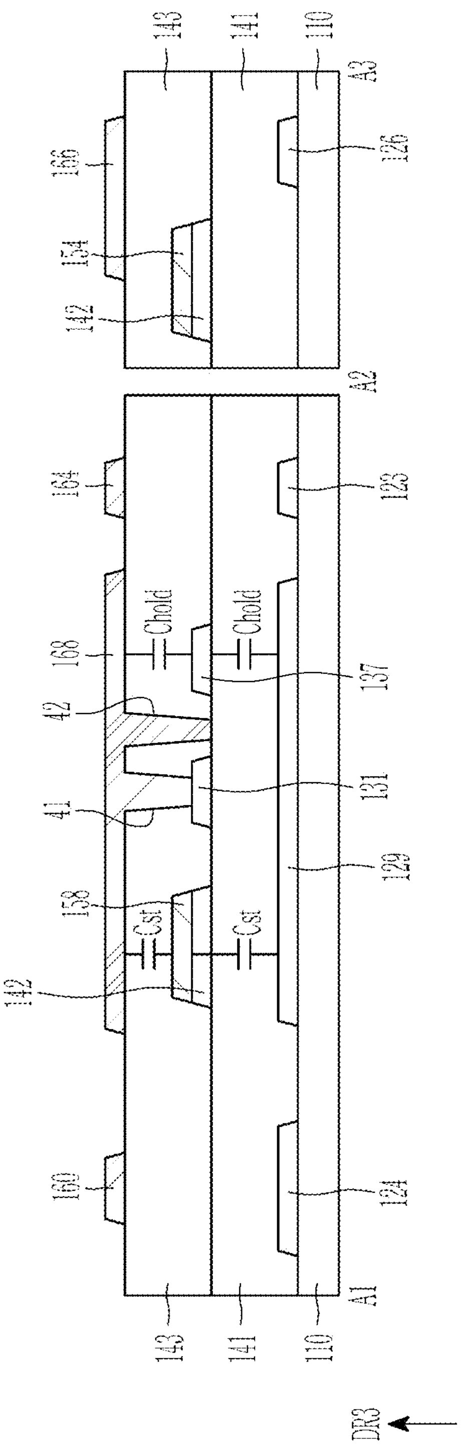
FIG. 16 is a cross-sectional view taken along line A1-A2 and line A2-A3 of the display device shown in FIG. 15.

FIG. 15 and FIG. 16 further illustrate a third conductive layer disposed on the second conductive layer.

Referring to FIG. 16, the third insulating layer 143 may be disposed on the first insulating layer 141 and the second conductive layer. The third insulating layer 143 may include an inorganic insulating material such as silicon oxide (SiOx) or silicon nitride (SiNx). The third insulating layer 143 may have a plurality of openings (or holes or contact holes).

The third insulating layer 143 may have an opening 40 disposed on a portion (conductive region) to which the second semiconductor pattern 132 of the two pixels PX_O and PX_E may be connected. The third insulating layer 143 may have an opening 41 disposed on a portion of the first semiconductor pattern 131 that overlaps the lower electrode 129 and that may be a conductive region. The third insulating layer 143 may have an opening 42 that may be adjacent to the first semiconductor pattern 131 without overlapping the first semiconductor pattern 131 and that may be disposed on the lower electrode 129. The third insulating layer 143 may have an opening 43_E disposed on the upper first scan line 150_E, an opening 43_O disposed on the upper first scan line 150_O. The third insulating layer 143 may have an opening 44 disposed on the gate electrode 157 of the second transistor T2. The third insulating layer 143 may have an opening 45 disposed on a portion of the conductive region of the third semiconductor pattern 133 overlapping the reference voltage line 121 without overlapping the lower electrode 129. The third insulating layer 143 may have an opening 46 adjacent to the opening 45 and disposed on the reference voltage line 121. The third insulating layer 143 may have an opening 47 disposed on a conductive region (corresponding to the first node N1) of a portion in which the third semiconductor pattern 133 and the second semiconductor pattern 132 may be connected. The third insulating layer 143 may have an opening 48 adjacent to the opening 47 and disposed on the gate electrode 158 of the first transistor T1. The third insulating layer 143 may have an opening 49 disposed on a portion of the seventh semiconductor pattern 137 overlapping the vertical portion 123 of the first power line 122. The third insulating layer 143 may have an opening 50 disposed on a portion in which the first power line 122 and the vertical portion 123 may be connected. The third insulating layer 143 may have an opening 51 disposed on a portion of the conductive region of the fifth semiconductor pattern 135 closer to the opening 50. The third insulating layer 143 may have an opening 52 disposed on a portion of the conductive region of the sixth semiconductor pattern 136 closer to the first power line 122. The third insulating layer 143 may have an opening 53 disposed on a portion in which the sixth semiconductor pattern 136 and the fourth semiconductor pattern 134 may be connected. The third insulating layer 143 may have an opening 54 disposed on a portion of the conductive region of the fourth semiconductor pattern 134 closer to the initialization voltage line 127. The third insulating layer 143 may have an opening 55 disposed on the upper initialization voltage line 156. The third insulating layer 143 may have an opening 56 disposed on the initialization voltage line 127.

A third conductive layer may be disposed on the third insulating layer 143. The third conductive layer may include a data line 160, a plurality of connection members 161_O, 161_E, 162, 163, 164, 166, 167_O, 167_E, and 170, and an upper electrode 168.

The data line 160 may extend in the second direction DR2 while passing between the first pixel PX_O and the second pixel PX_E, which may be adjacent to each other. The data line 160 may pass between the gate electrode 158 of the first transistor T1 of the first pixel PX_O and the gate electrode 158 of the first transistor T1 of the second pixel PX_E, and may intersect the scan lines including the first scan lines 120_E and 120_O, the upper first scan lines 150_E and 150_O, the second scan line 151, and third scan line 155 extending in the first direction DR1, the voltage lines including the reference voltage line 121, the initialization voltage line 127, the initialization voltage line 128, and the upper initialization voltage line 156, the power lines including the first power line 122 and the second power line 126, and the light emitting control lines including the first light emitting control line 153 and the second light emitting control line 154. The data line 160 may extend along a plurality of pixels PX of an adjacent pixel row and may be connected to the plurality of pixels PX. The data line 160 may be electrically connected to the portion (including a conductive region) to which the second semiconductor pattern 132 of the two pixels PX_O and PX_E may be connected through the opening 40 to transmit a data signal. Accordingly, the pixel circuit portions of two adjacent pixels PX_O and PX_E may be electrically connected to a data line 160.

Each of the plurality of connection members 161_O, 161_E, 162, 163, 164, 166, 167_O, 167_E, and 170 and the upper electrode 168 may have an island shape in each of the pixels PX_E and PX_O. For example, each of the plurality of connection members 161_O, 161_E, 162, 163, 164, 166, 167_O, 167_E, and 170 and the upper electrode 168 may be disposed entirely within each of the pixels PX_E and PX_O.

The connection member 161_O may be electrically connected to the upper first scan line 150_O through the opening 43_O.

The connection member 161_E may be electrically connected to the upper first scan line 150_E through the opening 43_E.

The connection member 162 may be electrically connected to a conductive region of the third semiconductor pattern 133 and the reference voltage line 121 through each of the openings 45 and 46. Accordingly, a conductive region of the third semiconductor pattern 133 may be electrically connected to the reference voltage line 121 and may receive the reference voltage VREF.

The connection member 163 may be electrically connected to a conductive region (corresponding to the first node N1) to which the third semiconductor pattern 133 and the second semiconductor pattern 132 are connected through the openings 47 and 48, respectively, and the gate electrode 158 of the first transistor T1. Accordingly, the conductive region (corresponding to the first node N1) to which the third semiconductor pattern 133 and the second semiconductor pattern 132 may be connected may be electrically connected to the gate electrode 158 of the first transistor T1.

The connection member 164 may extend long in the second direction DR2 along the vertical portion 123 of the first power line 122 to overlap the vertical portion 123. The connection member 164 may further include a horizontal portion 165 protruding therefrom to extend in the first direction DR1. The connection member 164 may be electrically connected to the seventh semiconductor pattern 137 through the opening 49 and may be electrically connected to the first power line 122 and a conductive region of the fifth semiconductor pattern 135 through each of the openings 50 and 51. Accordingly, the seventh semiconductor pattern 137 may be electrically connected to the first power line 122 and may receive the first power voltage VDD, and the fifth semiconductor pattern 135 may also be electrically connected to the first power line 122 and may receive the first power voltage VDD.

The connection member 166 may be electrically connected to a conductive region to which the sixth semiconductor pattern 136 and the fourth semiconductor pattern 134 are connected through the opening 53. The connection member 166 may further include an extended portion.

The connection member 167_O disposed in the first pixel PX_O may be electrically connected to a conductive region of the fourth semiconductor pattern 134 and the upper initialization voltage line 156 through each of the openings 54 and 55. Accordingly, a conductive region of the fourth semiconductor pattern 134 may be electrically connected to the upper initialization voltage line 156 and may receive the initialization voltage VAINT.

The connection member 167_E disposed in the second pixel PX_E may be electrically connected to a conductive region of the fourth semiconductor pattern 134 and the initialization voltage line 127 through each of the openings 54 and 56. Accordingly, a conductive region of the fourth semiconductor pattern 134 may be electrically connected to the initialization voltage line 127 and may receive the initialization voltage VAINT.

The upper electrode 168 may overlap most of the gate electrode 158 of the first transistor T1 and the seventh semiconductor pattern 137 in a plan view. The protrusion 169 may be connected to (or may be included in) the upper electrode 168. The protrusion 169 of the upper electrode 168 may be electrically connected to a conductive region of the sixth semiconductor pattern 136 through the opening 52. The conductive region of the sixth semiconductor pattern 136 connected to the protrusion 169 and the conductive region of the sixth semiconductor pattern 136 connected to the connection member 166 may be disposed opposite to each other with the second light emitting control line 154 interposed therebetween. The upper electrode 168 may also overlap the lower electrode 129 of the first semiconductor pattern 131 through each of the openings 41 and 42 and may be electrically connected to a portion (corresponding to the second node N2) that is a conductive region and the lower electrode 129. Accordingly, a conductive region (corresponding to the second node N2) of the first semiconductor pattern 131 may be electrically connected to the lower electrode 129 and the upper electrode 168. Accordingly, the lower electrode 129 and the upper electrode 168 may receive the voltage of the second node N2 corresponding to the second node N2.

Referring to FIG. 15 and FIG. 16, each of the lower electrode 129 and the upper electrode 168 corresponding to the second node N2 may overlap the gate electrode 158 of the first transistor T1 with each of the first insulating layer 141, the second insulating layer 142, and the third insulating layer 143 interposed therebetween to form the first capacitor Cst. Each of the lower electrode 129 and the upper electrode 168 corresponding to the second node N2 may overlap the conductive seventh semiconductor pattern 137 with each of the first insulating layer 141 and the third insulating layer 143 interposed therebetween to form the second capacitor Chold.

The third conductive layer may be formed as a multiple layer, and may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), and/or copper (Cu). For example, the third conductive layer may be formed as a triple layer such as Ti/Al/Ti.

Referring to FIG. 15, the shielding pattern 124 overlaps the data line 160 and may extend parallel to the data line 160 in the second direction DR2. The wing portion 125 connected to the shielding pattern 124 or included in the shielding pattern 124 may protrude from the shielding pattern 124 toward the pixel circuit portion of the first pixel PX_O to extend in the first direction DR1. The shielding pattern 124 and the wing portion 125 together may shield the periphery of at least a portion of the edges of the gate electrode 158 of the first transistor T1 corresponding to the first node N1 of the first pixel PX_O and/or the lower electrode 129 and the upper electrode 168 corresponding to the second node N2.

Specifically, the shielding pattern 124 may include a portion disposed between the gate electrode 158 and/or the lower electrode 129 and the upper electrode 168 of the first transistor T1 of the first pixel PX_O and the gate electrode 157 of the second transistor T2 of the second pixel PX_E. Accordingly, the shielding pattern 124 may shield the coupling (or parasitic capacitance) between the gate electrode 158 and/or the lower electrode 129 and the upper electrode 168 of the first transistor T1 of the first pixel PX_O and the gate electrode 157 of the second transistor T2 of the second pixel PX_E.

The wing portion 125 of the shielding pattern 124 may include a portion disposed between the gate electrode 158 and/or the lower electrode 129 and the upper electrode 168 of the first transistor T1 of the first pixel PX_O and the gate electrode 157 of the second transistor T2 of the first pixel PX_O. Accordingly, the wing portion 125 of the shielding pattern 124 may shield the coupling between the gate electrode 158 and/or the lower electrode 129 and the upper electrode 168 of the first transistor T1 of the first pixel PX_O and the gate electrode 157 of the second transistor T2 of the first pixel PX_O.

Accordingly, referring to FIG. 15, the magnitude of the primary kickback (1st KB) CC by the coupling between the gate electrode 157 of the second transistor T2 and the gate electrode 158 of the first transistor T1 and/or the lower electrode 129 and the upper electrode 168 in the second pixel PX_E remains unchanged, while the magnitude of the primary kickback (1st KB) DD by the coupling between the gate electrode 157 of the second transistor T2 and the gate electrode 158 of the first transistor T1 and/or the lower electrode 129 and the upper electrode 168 may be reduced in the first pixel PX_O. In addition, the gate electrode 157 of the second transistor T2 of the second pixel PX_E and the gate electrode 158 of the first transistor T1 of the first pixel PX_O and/or the lower electrode 129 and the upper electrode 168 may be shielded by the shielding pattern 124 and the wing portion 125, and the magnitude of the secondary kickback (2nd KB) affecting the first node N1 and/or the second node N2 of the first pixel PX_O may also be reduced. Further, the difference between the magnitude of the primary kickback of the first node N1 and/or the second node N2 in the second pixel PX_E and the sum of the magnitudes of the primary kickback and the secondary kickback of the first node N1 and/or the second node N2 in the first pixel PX_O may be reduced.

Accordingly, a deviation between the luminance of the first pixel PX_O and the luminance of the second pixel PX_E may be reduced, and the occurrence of stains in the image of the display device may be reduced or eliminated. That is, according to an embodiment, among the first and second pixels PX_O and PX_E, which share a data line DL and receive the first scan signals GW_O and GW_E at different timings, the difference between the magnitudes of the primary kickback and the secondary kickback affecting the first pixel PX_O and the magnitude of the primary kickback affecting the second pixel PX_E may be reduced, and display defects such as the deviation of driving current and luminance and image stains of the light emitting element of the first pixel PX_O and the second pixel PX_E may be reduced or eliminated.

Figure 17:
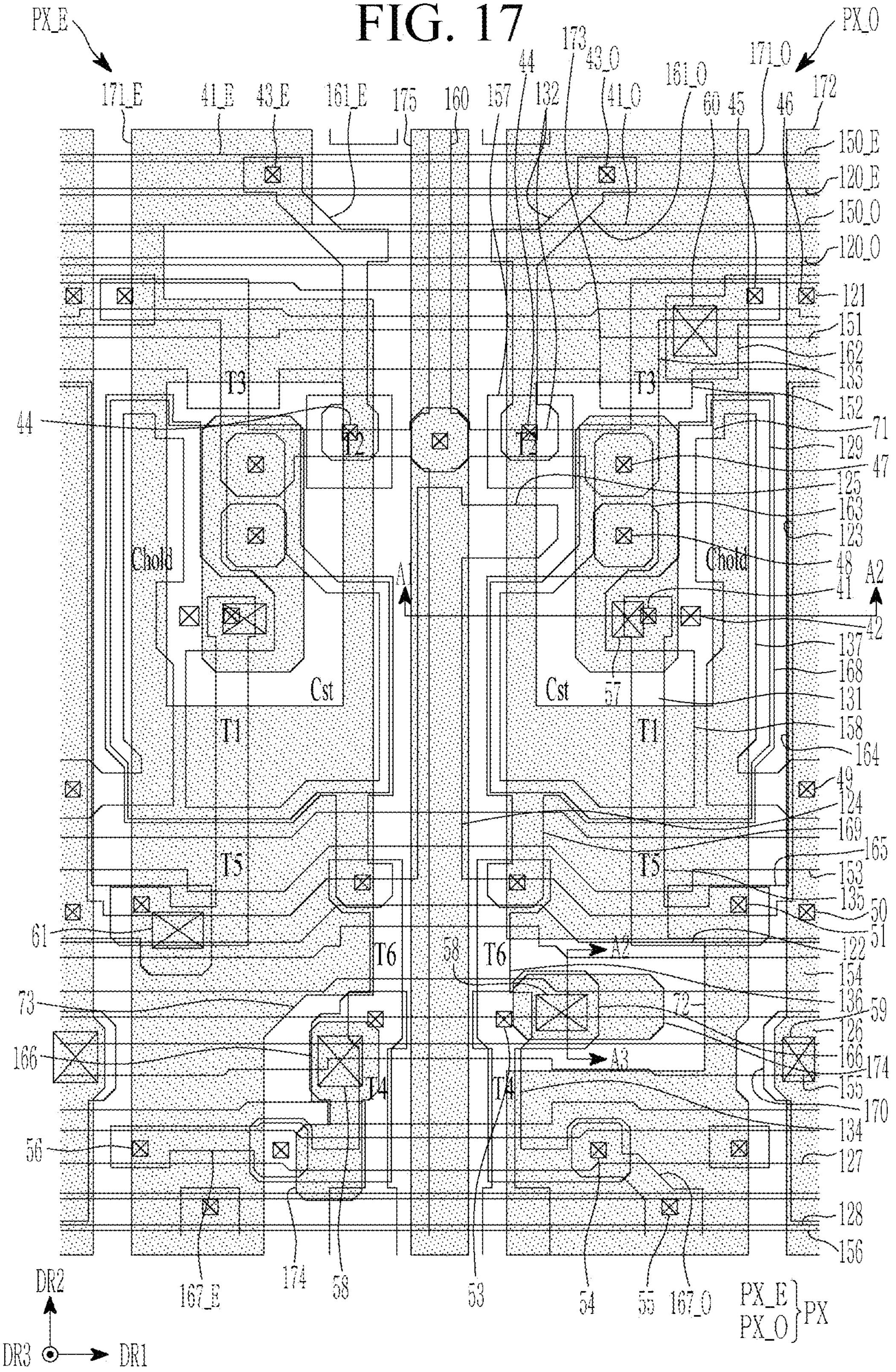
Figure 18:
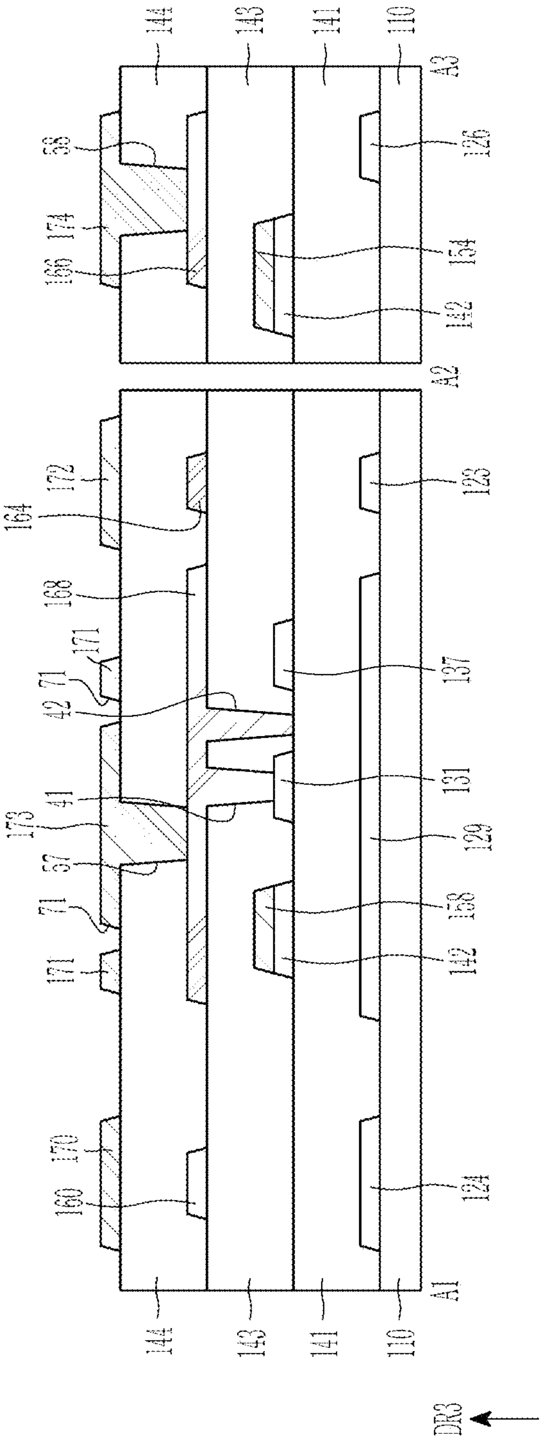
FIG. 18 is a cross-sectional view taken along line A1-A2 and line A2-A3 of the display device shown in FIG. 17.

FIG. 17 and FIG. 18 further illustrate a fourth conductive layer disposed on the third conductive layer.

Referring to FIG. 18, a fourth insulating layer 144 may be disposed on the third insulating layer 143 and the third conductive layer. The fourth insulating layer 144 may include an inorganic insulating material such as silicon oxide (SiOx) and silicon nitride (SiNx), a general-purpose polymer such as polymethylmethacrylate (PMMA) and polystyrene (PS), a polymer derivative having a phenolic group, an acryl-based polymer, an imide-based polymer, an acryl-based polymer, and a siloxane-based polymer, and may be formed of a single layer or multiple layers.

The fourth insulating layer 144 may have a plurality of openings (or holes or contact holes).

Specifically, the fourth insulating layer 144 may have an opening 57 disposed on the upper electrode 168, an opening 58 disposed on the connection member 166, an opening 59 disposed on the connection member 170, an opening 60 disposed on the connection member 162 disposed in the first pixel PX_O, and an opening 61 disposed on the extension of the horizontal portion 165 of the connection member 164 disposed in the second pixel PX_E.

A fourth conductive layer may be disposed on the fourth insulating layer 144. The fourth conductive layer may include a first conductive line 171_O overlapping the first pixel PX_O, a second conductive line 171_E overlapping the second pixel PX_E, a third conductive line 172, a fourth conductive line 175, and conductive patterns 173 and 174.

The first conductive line 171_O may extend long in the second direction DR2 to overlap a plurality of pixels PX disposed in the same pixel column as the first pixel PX_O, including the first pixel PX_O. The first conductive line 171_O may be electrically connected to the connection member 162 disposed in the first pixel PX_O through the opening 60. Accordingly, the first conductive line 171_O may transmit or receive the reference voltage VREF through the connection member 162, and may transmit the reference voltage VREF in the second direction DR2 in the display area.

The second conductive line 171_E may extend long in the second direction DR2 to overlap a plurality of pixels PX disposed in the same pixel column as the second pixel PX_E, including the second pixel PX_E. The second conductive line 171_E may be electrically connected to the horizontal portion 165 of the connection member 164 disposed in the second pixel PX_E through the opening 61. Accordingly, the second conductive line 171_E may transmit or receive the first power voltage VDD through the connection member 164, and may transmit the first power voltage VDD in the second direction DR2 in the display area.

The third conductive line 172 may extend long in the second direction DR2, and may be disposed between adjacent pixels PX without the data line 160 interposed therebetween. The third conductive line 172 may overlap the vertical portion 123 of the first power line 122 in a plan view. The third conductive line 172 may be electrically connected to the connection member 170 through the opening 59. The third conductive line 172 may transmit a constant voltage—for example, the second power voltage VSS or the initialization voltage VAINT—in the second direction DR2.

The fourth conductive line 175 may extend long in the second direction DR2, and may be disposed between the first pixel PX_O and the second pixel PX_E, which may be adjacent to each other with the data line 160 interposed therebetween. The fourth conductive line 175 may overlap the data line 160 in a plan view. The fourth conductive line 175 may intersect the scan lines 120_E, 120_O, 150_E, 150_O, 151, and 155, the voltage lines 121, 127, 128, and 156, the power lines 122 and 126, and the light emitting control lines 153 and 154. The fourth conductive line 175 may transmit a constant voltage—for example, the second power voltage VSS or the initialization voltage VAINT—in the second direction DR2. The voltage transmitted by the fourth conductive line 175 may be a voltage different from the voltage transmitted by the third conductive line 172.

Each of the first conductive line 171_O and the second conductive line 171_E may have an opening 71 disposed in an island shape in each of the pixels PX_O and PX_E. The conductive pattern 173 may be disposed inside the opening 71 in a plan view and may be insulated from the first conductive line 171_O and the second conductive line 171_E. The conductive pattern 173 may be electrically connected to the upper electrode 168 through the opening 57.

The first conductive line 171_O may further include an opening 72 spaced apart from the opening 71, and the second conductive line 171_E may have a concave portion 73 in a plan view. In some embodiments, the concave portion 73 may have an opening shape formed within the second conductive line 171_E. The conductive pattern 174 disposed in the first pixel PX_O may be disposed inside the opening 72 in a plan view and may be insulated from the first conductive line 171_O. The conductive pattern 174 disposed in the first pixel PX_O may be electrically connected to the connection member 166 through the opening 58. The conductive pattern 174 disposed in the second pixel PX_E may be disposed within the concave portion 73 in a plan view and may be insulated from the second conductive line 171_E. The conductive pattern 174 disposed in the second pixel PX_E may be electrically connected to the connection member 166 through the opening 58.

The fourth conductive layer may be formed as a single layer or a multilayer, and may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), and/or copper (Cu). For example, the fourth conductive layer may be formed of a triple layer such as Ti/Al/Ti.

Although not shown, a fifth insulating layer may be disposed on the fourth conductive layer. The fourth conductive layer may include an organic insulating material such as a general-purpose polymer such as polymethylmethacrylate (PMMA) or polystyrene (PS), a polymer derivative having a phenolic group, an acryl-based polymer, an imide-based polymer, a polyimide, and a siloxane-based polymer. A plurality of pixel electrodes may be disposed on the fifth insulating layer. The pixel electrode may be an anode electrode of the light emitting element LD, and may be electrically connected to the conductive pattern 174 through an opening of the fifth insulating layer. Accordingly, the pixel electrode may be electrically connected to the conductive pattern 174, the connection member 166, and the conductive region to which the sixth semiconductor pattern 136 and the fourth semiconductor pattern 134 may be connected.

A sixth insulating layer may be disposed on the pixel electrode. The sixth insulating layer may include an organic insulating material, and for specific example, may include an organic insulating material such as a general-purpose polymer such as polymethylmethacrylate (PMMA) or polystyrene (PS), a polymer derivative having a phenolic group, an acryl-based polymer, an imide-based polymer, a polyimide, and a siloxane-based polymer. The sixth insulating layer may be disposed on the pixel electrode and may have an opening for defining a light emitting area of each pixel PX, and an organic layer including a light emitting layer may be disposed in the opening of the sixth insulating layer. The light emitting layer may include at least one of an organic light emitting material, an inorganic light emitting material, or a quantum dot that may be a semiconductor nanocrystal.

A common electrode, which may be a cathode electrode of the light emitting element LD, may be disposed on the light emitting layer. The common electrode may receive the second power voltage VSS.

The pixel electrode, the light emitting layer, and the common electrode may together form a light emitting element LD that may be a light emitting diode.

An encapsulation portion may be disposed on the light emitting element LD to prevent moisture and/or oxygen from penetrating into the light emitting layer from the outside of the display device. The encapsulation portion may include a single layer or a single substrate, and may include at least one organic film and at least one inorganic film alternately stacked. In some embodiments, the encapsulation portion may have a triple-layered structure configured of an inorganic film, an organic film, and an inorganic film, in that order.

A touch electrode may be formed on the encapsulation portion, or a polarizing plate or a window may be disposed thereon.

A display device according to an embodiment will now be described with reference to FIG. 19 together with the drawings described herein.

FIG. 19 is a table showing a difference between driving currents of two adjacent pixels for various grayscales in a display device according to a comparative example and a display device according to an embodiment. Specifically, FIG. 19 represents the deviation (ΔI_RED) of the driving current of the light emitting element LD of the first pixel PX_O and the second pixel PX_E in percentage (%) for several example grayscales 11G, 31G, 87G, and 255G of images displayed by each pixel of the display devices according to the comparative example and an embodiment. The deviation of the driving current (ΔI_RED) may be a value obtained by subtracting the driving current of the light emitting element of the second pixel PX_E from the driving current of the light emitting element of the first pixel PX_O and dividing it by the value of the driving current of the light emitting element of the first pixel PX_O.

The first pixel PX_O and the second pixel PX_E may be, for example, pixels capable of displaying red light, but are not limited thereto, and the first pixel PX_O and the second pixel PX_E may display different colored light.

The display device according to the comparative example does not include the shielding pattern 124 and/or the wing portion 125. Accordingly, in the display device according to the comparative example, a difference between the magnitudes of the primary kickback and the secondary kickback affecting the first pixel PX_O and the magnitude of the primary kickback affecting the second pixel PX_E may be larger than that in the display device according to an embodiment. Accordingly, it may be seen in FIG. 19 that the absolute value of the driving current deviation (ΔI_RED) of the display device according to the comparative example is greater than the absolute value of the driving current deviation (ΔI_RED) of the display device including the shielding pattern 124 and/or the wing portion 125.

In a case that the display device according to an embodiment has a smaller deviation between the driving current of the light emitting element of the first pixel PX_O and the driving current of the light emitting element of the second pixel PX_E than the display device according to the comparative example, the deviation between the luminance of the first pixel PX_O and the luminance of the second pixel PX_E displaying the image of the same grayscale may be reduced, and the occurrence of stains on the image of the display device may be reduced or eliminated. That is, according to an embodiment, among the first pixel PX_O and the second pixel GW_E that share a data line DL and receive the first scan signals GW_O and GW_E at different timings, a difference between the magnitudes of the primary kickback and the secondary kickback affecting the first pixel PX_O and the second pixel PX_E and the magnitude of the primary kickback affecting the second pixel PX_E may be reduced. Accordingly, it is possible to reduce display defects such as the deviation of driving current and luminance and image stains of the light emitting element of the first pixel PX_O and the second pixel PX_E.

A display device according to an embodiment will be described with reference to FIG. 20 together with the drawings described herein.

Figure 20:
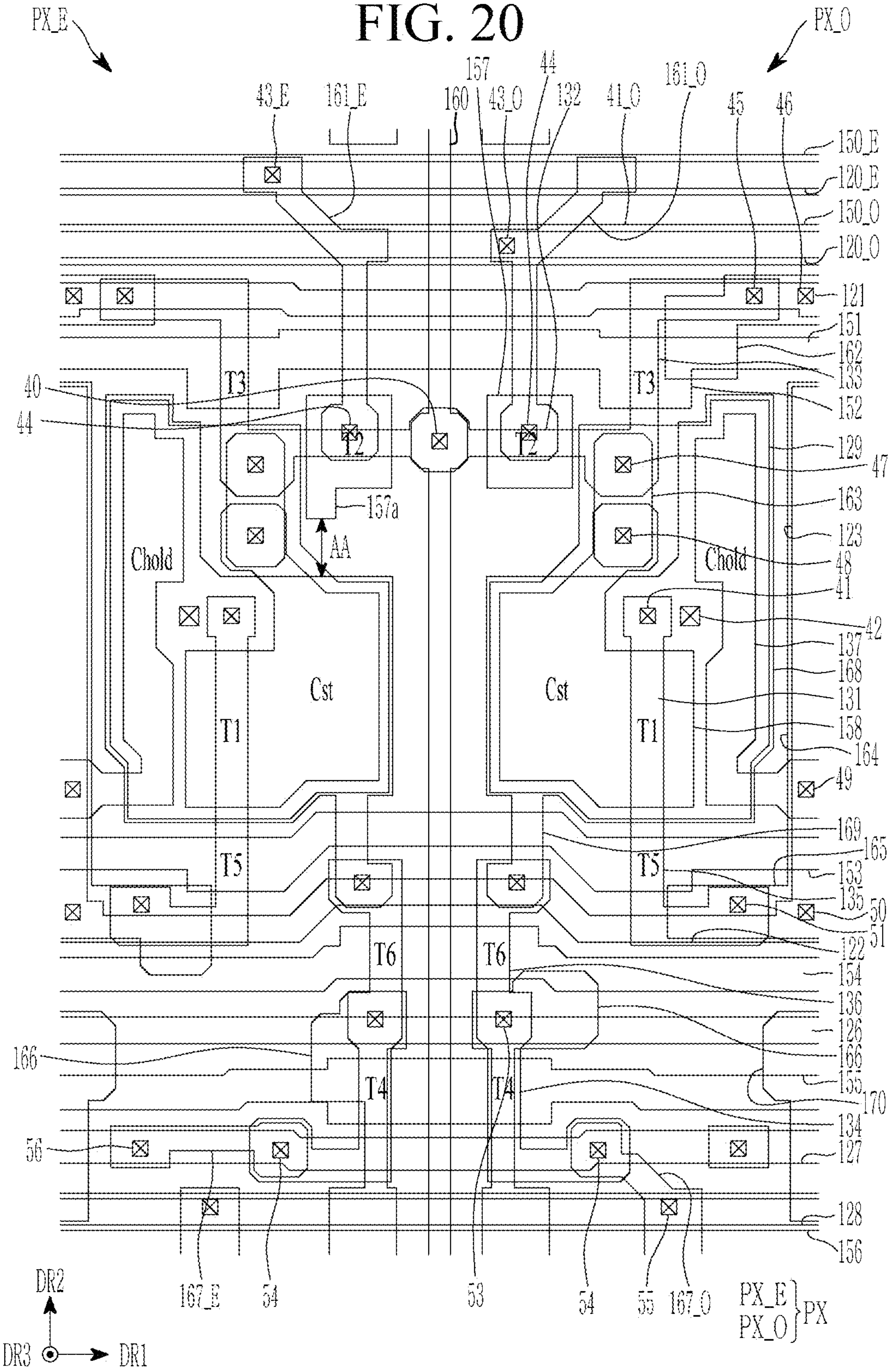
FIG. 20 is a layout view of two adjacent pixels of a display device according to an embodiment.

FIG. 20 is a layout view of two adjacent pixels of a display device according to an embodiment.

Referring to FIG. 20, the shape of the gate electrode 157 of the second transistor T2 disposed in the second pixel PX_E and the shape of the gate electrode 157 of the second transistor T2 disposed in the first pixel PX_O may be different from each other. For example, the gate electrode 157 of the second transistor T2 disposed in the second pixel PX_E may further include a protrusion 157*a* protruding toward the gate electrode 158 of the first transistor T1 of the second pixel PX_E and/or the lower electrode 129 and the upper electrode 168. However, the gate electrode 157 of the second transistor T2 disposed in the first pixel PX_O may not have any protrusions protruding toward the gate electrode 158 of the first transistor T1 of the first pixel PX_O and/or the lower electrode 129 and the upper electrode 168 of the first pixel PX_O.

According to an embodiment, an area of the gate electrode 157 of the second transistor T2 disposed in the second pixel PX_E may be larger than that of the gate electrode 157 of the second transistor T2 disposed in the first pixel PX_O. In addition, according to an embodiment, the shortest distance between the gate electrode 157 of the second transistor T2 disposed in the second pixel PX_E and the gate electrode 158 of the first transistor T1 of the second pixel PX_E facing it and/or the lower electrode 129 and the upper electrode 168 may be shorter than that between the gate electrode 157 of the second transistor T2 disposed in the first pixel PX_O and the gate electrode 158 of the first transistor T1 of the first pixel PX_O facing it and/or the lower electrode 129 and the upper electrode 168.

Accordingly, in the second pixel PX_E, a distance between the gate electrode 157 of the second transistor T2 and the gate electrode 158 of the first transistor T1 and/or the lower electrode 129 and the upper electrode 168 may become close as compared to a distance between the gate electrode 157 of the second transistor T2 and the gate electrode 158 of the first transistor T1 and/or the lower electrode 129 and the upper electrode 168 in the first the second pixel PX_O. Therefore, the magnitude of the primary kickback AA affecting the first node N1 and/or the second node N2 of the second pixel PX_E may be increased, and the difference between the magnitude of the primary kickback and the secondary kickback affecting the first pixel PX_O and the magnitude of the primary kickback affecting the second pixel PX_E may be reduced or eliminated.

The display device according to an embodiment may include the shielding pattern 124 and/or the wing portion 125 described herein.

A display device according to an embodiment will be described with reference to FIG. 21 together with the drawings described herein.

Figure 21:
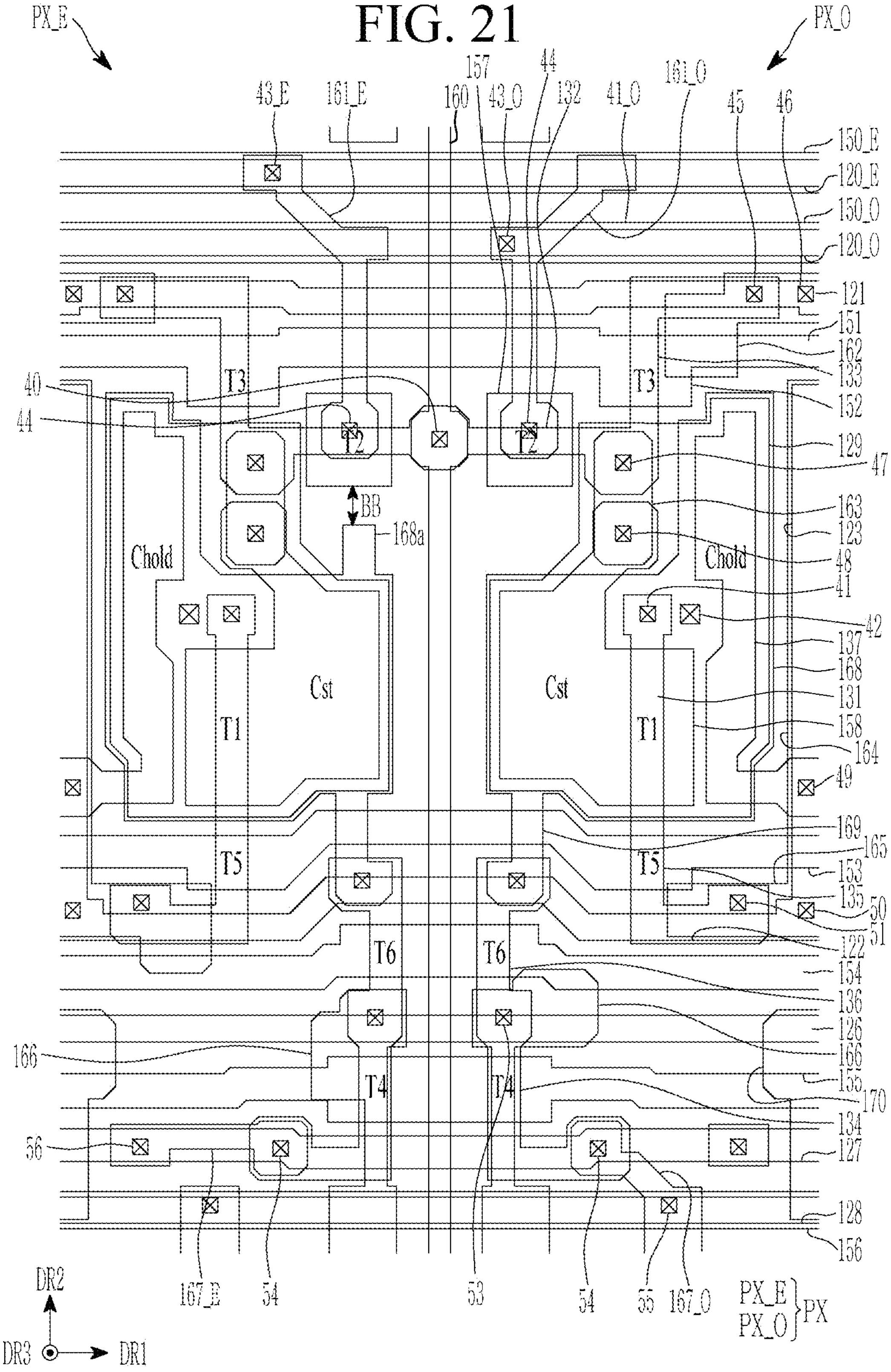
FIG. 21 is a layout view of two adjacent pixels of a display device according to an embodiment.

FIG. 21 is a layout view of two adjacent pixels of a display device according to an embodiment.

Referring to FIG. 21, at least one of the gate electrode 158 (electrode of the first node N1) of the first transistor T1 disposed in the second pixel PX_E or the lower electrode 129 and the upper electrode 168 (electrode of the second node N2) may further include a protrusion 168*a* protruding toward the gate electrode 157 of the second transistor T2 of the second pixel PX_E. For example, FIG. 21 illustrates the protrusion 168*a* protruding from the upper electrode 168, but the present disclosure is not limited thereto. For example, the protrusion 168*a* may be disposed on the same layer as the gate electrode 158 of the first transistor T1 or the lower electrode 129, instead of the upper electrode 168, and may protrude therefrom.

On the other hand, at least one of the gate electrode 158 of the first transistor T1, the lower electrode 129, or the upper electrode 168 disposed in the first pixel PX_O may not have a protrusion protruding toward the gate electrode 157 of the second transistor T2 of the first pixel PX_O.

According to an embodiment, an area of at least one of the gate electrode 158 of the first transistor T1, the lower electrode 129, or the upper electrode 168 disposed in the second pixel PX_E may be greater than an area of at least one of the gate electrode 158 of the first transistor T1, the lower electrode 129, or the upper electrode 168 disposed in the first pixel PX_O. In addition, according to an embodiment, the shortest distance between the gate electrode 157 of the second transistor T2 disposed in the second pixel PX_E and the gate electrode 158 of the first transistor T1 of the second pixel PX_E facing it and/or the lower electrode 129 and the upper electrode 168 may be shorter than that between the gate electrode 157 of the second transistor T2 disposed in the first pixel PX_O and the gate electrode 158 of the first transistor T1 of the first pixel PX_O facing it and/or the lower electrode 129 and the upper electrode 168.

Accordingly, in the second pixel PX_E, a distance between the gate electrode 157 of the second transistor T2 and the gate electrode 158 of the first transistor T1 and/or the lower electrode 129 and the upper electrode 168 may become close as compared to a distance between the gate electrode 157 of the second transistor T2 and the gate electrode 158 of the first transistor T1 and/or the lower electrode 129 and the upper electrode 168 in the first the second pixel PX_O. Therefore, the magnitude of the primary kickback BB affecting the first node N1 and/or the second node N2 of the second pixel PX_E may be increased, and the difference between the magnitude of the primary kickback and the secondary kickback affecting the first pixel PX_O and the magnitude of the primary kickback affecting the second pixel PX_E may be reduced or eliminated.

The display device according to an embodiment may include the shielding pattern 124 and/or the wing portion 125 described herein. In some embodiments, the display device according to an embodiment shown in FIG. 21 may include the protrusion 157*a* in an embodiment shown in FIG. 20. In some embodiments, the display device may include two or more of the shielding pattern 124 and/or the wing portion 125, the protrusion 157*a*, and the protrusion 168*a*.

The display device according to some embodiments can be applied to various electronic devices. An electronic device according to an embodiment comprises the aforementioned display device and may further comprise a module or a device with additional functions other than the display device.

Figure 22:
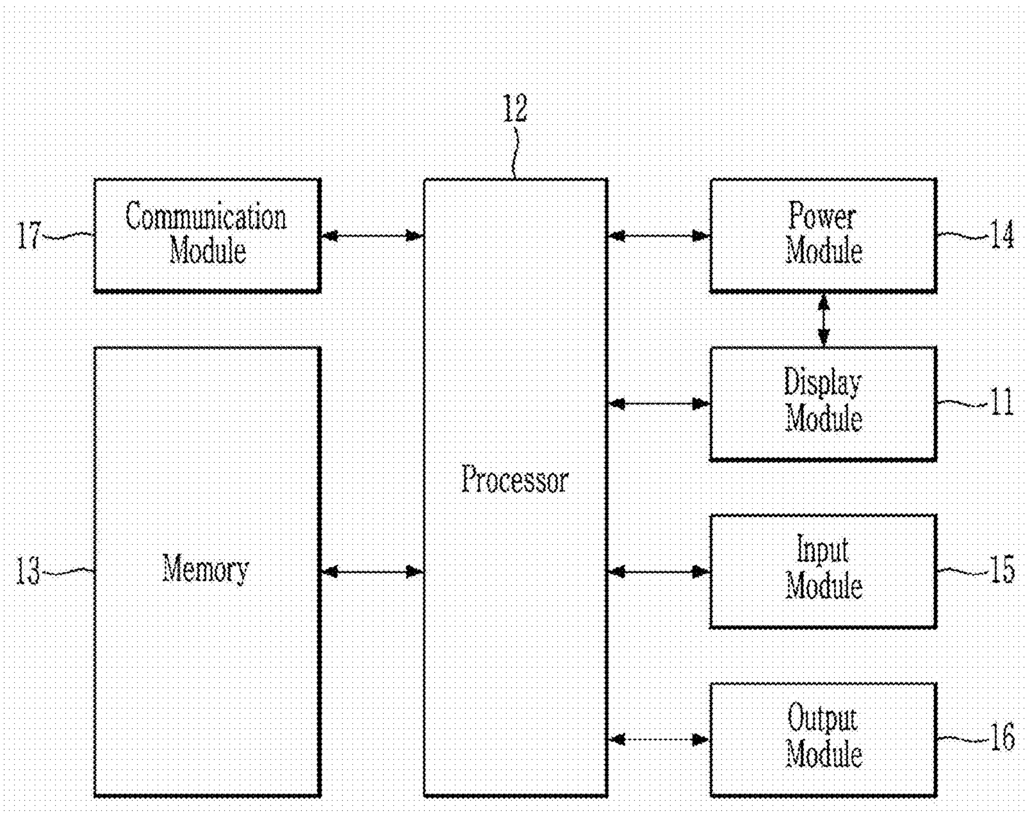
FIG. 22 is a block diagram of an electronic device according to an embodiment.

FIG. 22 is a block diagram of an electronic device according to an embodiment. Referring to FIG. 22, an electronic device 10 according to an embodiment may comprise a display module 11, a processor 12, a memory 13, and a power module 14. The electronic device 10 may further comprise an input module 15, a non-visual output module 16, and/or a communication module 17. The display module may comprise a display device according to an embodiment as described above.

The electronic device 10 may output various information in the form of images via the display module 11. When the processor 12 executes an application stored in the memory 13, an image information provided from the application may be provided to a user via the display module 11. The power module 14 may comprise a power supply module such as a power adapter or a battery device, and a power conversion module that converts the power supplied by the power supply module to generate the power necessary for operation of the electronic device 10. The input module 15 may provide an input information to the processor 12 and/or the display module 11. The non-visual output module 16 may receive information other than the image information, such as sound, haptic, or light information provided from the processor 12, and provide it to the user. The communication module 17 is responsible for transmitting and receiving information between the electronic device 10 and an external device, and may comprise a receiver and a transmitter.

At least one of the aforementioned components of the electronic device 11 may be included within the display device according to some embodiments. In addition, some of the individual modules that are functionally included in one module may be included within the display device, while others may be provided separately from the display device. For example, a display device according to an embodiment may include the display module 11, while the processor 12, the memory 13, and the power module 14 may be provided in a form of other devices within the electronic device 11, not within the display device.

Figure 23:
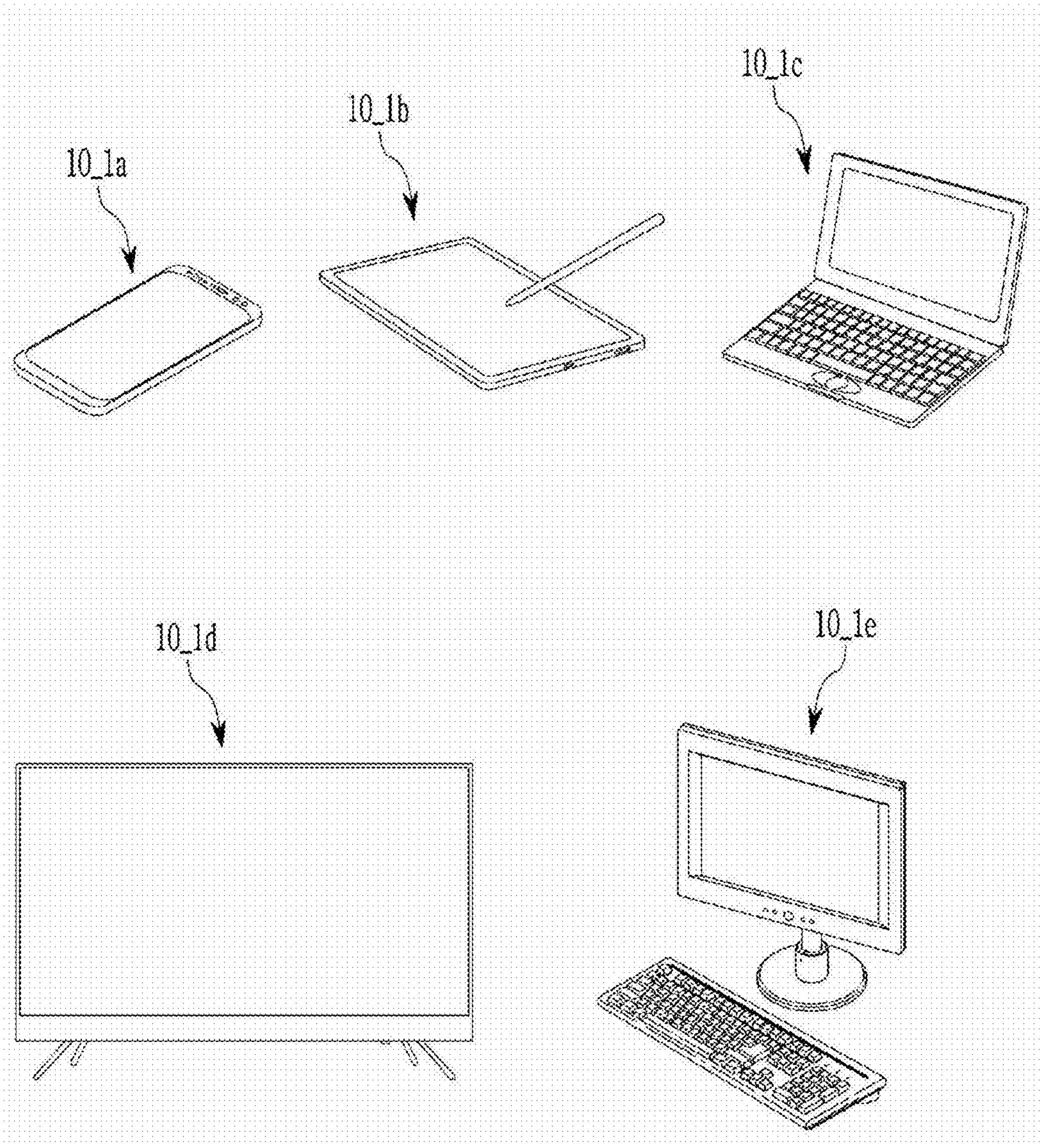
FIG. 23, FIG. 24, and FIG. 25 are schematic diagrams of electronic devices according to various embodiments.
Figure 24:
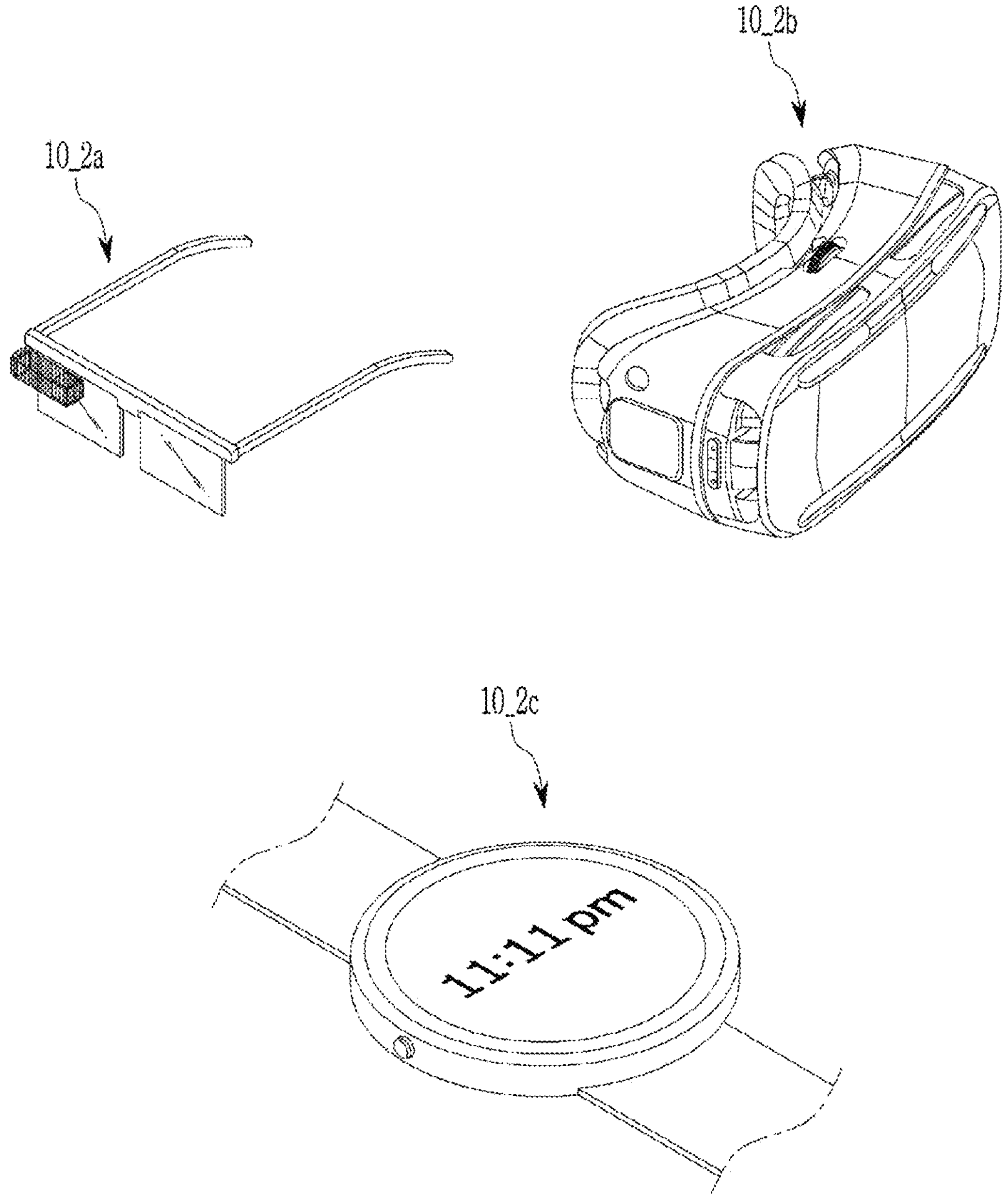
Figure 25:
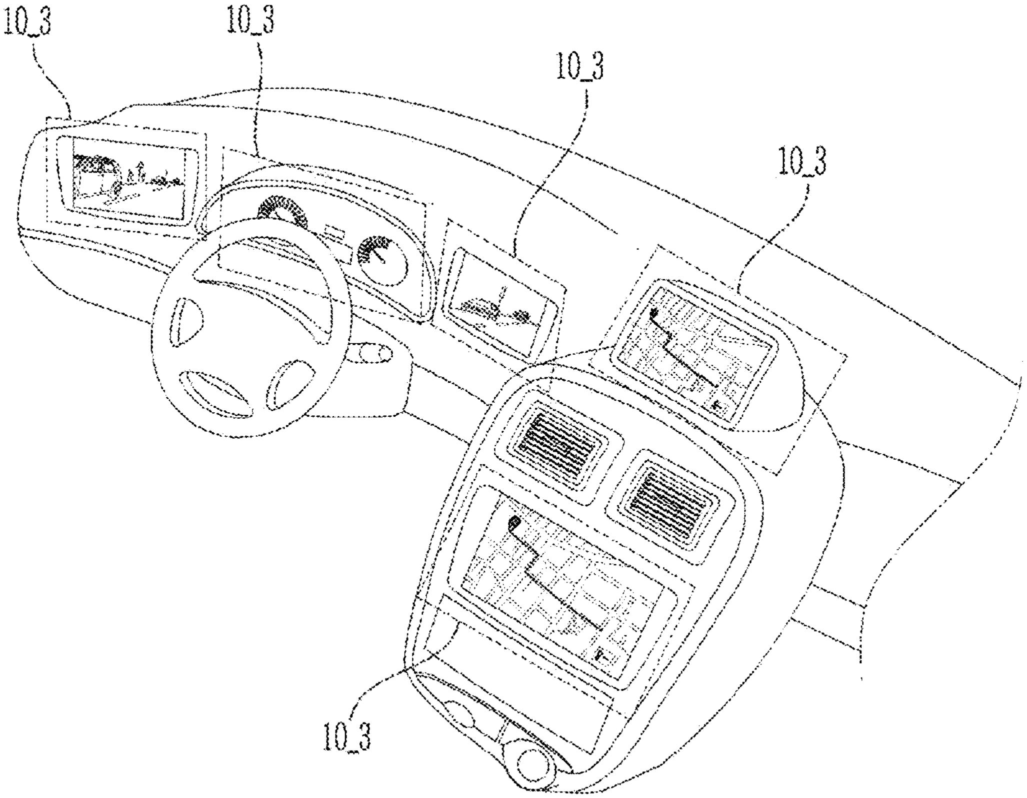

FIG. 23 to FIG. 25 are schematic diagrams of electronic devices according to various embodiments. FIG. 23 to FIG. 25 illustrate examples of various electronic devices to which a display device according to an embodiment is applied.

FIG. 23 illustrates examples of electronic devices, including a smartphone 10_1*a*, a tablet PC 10_1*b*, a laptop 10_1*c*, a TV 10_1*d*, and a desktop monitor 10_1*e*.

A smartphone 10_1*a* may comprise an input module such as a touch sensor and a communication module in addition to the display module 11. The smartphone 10_1*a* may process information received through the communication module or other input modules and display the information through the display module of the display device.

Each of the tablet PC 10_1*b*, the laptop 10_1*c*, the TV 10_1*d*, and the desktop monitor 10_1*e* may comprise a display module and an input module similar to the smartphone 10_1*a*, and may additionally comprise a communication module depending on embodiments.

FIG. 24 illustrates an example where an electronic device including a display module is applied to a wearable electronic device. The wearable electronic device may be smart glasses 10_2*a*, a head-mounted display 10_2*b*, a smart watch 10_2*c*, and so on.

The smart glasses 10_2*a* and the head-mounted display 10_2*b* may comprise a display module that projects display images and a reflector that reflects the projected display images to provide it to a user's eyes, through which, a screen of virtual reality or augmented reality may be provided to the user.

The smart watch 10_2*c* may comprise a biometric sensor as an input device, and may provide biometric information recognized through the biometric sensor to a user via a display module.

FIG. 25 illustrates an example of an electronic device including a display module applied to a vehicle. For example, an electronic device 10_3 may be applied to an instrument panel, or a center fascia, etc. of a car, or it may be applied to a CID (Center Information Display) placed on a dashboard of a car, or it may be applied to a room mirror display replacing a side mirror.

Although not illustrated, an electronic device to which a display device according to embodiments is applied may include not only devices primarily focused on screen display such as a billboard, an electronic signboard, and a gaming machine, but also various home appliances that display information through a display module, such as a refrigerator, a washing machine, a dryer, an air conditioner, and a robot vacuum cleaner. Furthermore, when the display module has a light-transmitting function, it can be applied to an electronic device such as a smart window or a transparent display device that show both the background and a displayed image. The types of electronic devices according to some embodiments are not limited to the examples given above, and application to various other electronic devices not mentioned may also be possible.

While embodiments of the present disclosure have been described in connection with what is presently considered to be practical embodiments, it is to be understood that the disclosure is not limited thereto, but, on the contrary, is intended to cover various modifications and equivalent arrangements included within the spirit and scope of the appended claims.

DESCRIPTION OF SYMBOLS

41, 42, 43_E, 43_O, 44, 45, 46, 47, 48, 49, 50, 51, 52, 53, 54, 55, 56, 57, 58, 59, 60, 61, 71, 72: opening
110: substrate
120_E, 120_O, 150_E, 150_O, 151, 155: scan line
121: reference voltage line
122: first power line
124: shielding pattern
125: wing portion
126: second power line
127, 128: initialization voltage line
129: lower electrode
131, 132, 133, 134, 135, 136, 137: semiconductor pattern
141, 142, **142*a*, 143, 144**: insulating layer
153, 154: light emitting control line
156: upper initialization voltage line
157, 158: gate electrode
160: data line
161_O, 161_E, 162, 163, 164, 166, 167_O, 167_E, 170: connection member
168: upper electrode
171_E, 171_O, 172, 175: conductive line
173, 174: conductive pattern
300: display panel
1000: display device

What is claimed is:

1. A display device comprising:
a substrate;
a first scan line and a second scan line disposed on the substrate;
a data line intersecting the first scan line and the second scan line;
a first pixel circuit portion and a second pixel circuit portion adjacent to each other in a first direction with the data line therebetween; and
a shielding pattern disposed between the first pixel circuit portion and the second pixel circuit portion,
wherein each of the first pixel circuit portion and the second pixel circuit portion comprises:
a first transistor including a first gate electrode connected to a first node, and a first electrode connected to a second node; and
a second transistor connected between the first node and the data line and including a second gate electrode capable of receiving a first scan signal, and the shielding pattern includes an asymmetrical portion protruding toward the first pixel circuit portion in a plan view.

2. The display device of claim 1, wherein
the shielding pattern and the asymmetrical portion are disposed in a same conductive layer.

3. The display device of claim 1, wherein
the shielding pattern transmits a constant voltage.

4. The display device of claim 1, wherein
the shielding pattern overlaps the data line in a plan view and extends in a second direction perpendicular to the first direction.

5. The display device of claim 1, wherein
the first electrode includes a lower electrode overlapping the first gate electrode, and
the first gate electrode and the lower electrode overlap each other to form a first capacitor.

6. The display device of claim 5, wherein
the first electrode further includes an upper electrode overlapping the first gate electrode, and
the first gate electrode and the upper electrode overlap each other to form the first capacitor.

7. The display device of claim 6, wherein
the lower electrode, the first gate electrode, and the upper electrode are sequentially disposed on the substrate and overlap each other in a plan view.

8. The display device of claim 1, wherein
the asymmetrical portion is disposed in the first direction between the second gate electrode and the first electrode of the first pixel circuit portion in a plan view.

9. The display device of claim 1, wherein
the asymmetrical portion is a wing portion that protrudes toward the first pixel circuit portion.

10. The display device of claim 1, further comprising
a first power line electrically connected to a second electrode of the first transistor and transmitting a first power voltage,
wherein the shielding pattern is electrically connected to the first power line.

11. The display device of claim 1, further comprising
a gate driver that transmits a first scan signal to the first scan line and a second scan signal to the second scan line,
wherein the second scan signal changes from a turn-off voltage level to a turn-on voltage level while the first scan signal is at the turn-on voltage level, and changes to the turn-off voltage level after the first scan signal changes to the turn-off voltage level.

12. The display device of claim 1, wherein
the first scan line and the second scan line are repeatedly disposed for each pixel row in pairs.

13. An electronic device comprising:
a display module; and
a processor electrically connected to the display module, wherein the display module comprises:
a substrate;
a first scan line and a second scan line disposed on the substrate;
a data line intersecting the first scan line and the second scan line;
a first pixel circuit portion and a second pixel circuit portion adjacent to each other in a first direction with the data line therebetween; and
a shielding pattern disposed between the first pixel circuit portion and the second pixel circuit portion, wherein each of the first pixel circuit portion and the second pixel circuit portion comprises:

a first transistor including a first gate electrode connected to a first node, and a first electrode connected to a second node; and a second transistor connected between the first node and the data line and including a second gate electrode capable of receiving a first scan signal, and the shielding pattern includes an asymmetrical portion protruding toward the first pixel circuit portion in a plan view.

14. The electronic device of claim 13, wherein the shielding pattern and the asymmetrical portion are disposed in a same conductive layer.

15. The electronic device of claim 13, wherein the shielding pattern overlaps the data line in a plan view and extends in a second direction perpendicular to the first direction.

16. The electronic device of claim 13, wherein the first electrode includes a lower electrode overlapping the first gate electrode and an upper electrode overlapping the first gate electrode, and the first gate electrode, the lower electrode, and the upper electrode overlap each other to form a first capacitor, and the lower electrode, the first gate electrode, and the upper electrode are sequentially disposed on the substrate and overlap each other in a plan view.

17. The electronic device of claim 13, wherein the asymmetrical portion is disposed in the first direction between the second gate electrode and the first electrode of the first pixel circuit portion in a plan view.

18. The electronic device of claim 13, wherein the asymmetrical portion is a wing portion that protrudes toward the first pixel circuit portion.

19. The electronic device of claim 13, further comprising a first power line electrically connected to a second electrode of the first transistor and transmitting a first power voltage, wherein the shielding pattern is electrically connected to the first power line.

20. A display device comprising:

a substrate;

a first scan line and a second scan line disposed on the substrate;

a data line intersecting the first scan line and the second scan line;

a first pixel circuit portion and a second pixel circuit portion adjacent to each other in a first direction with the data line therebetween; and a shielding pattern disposed between the first pixel circuit portion and the second pixel circuit portion, wherein each of the first pixel circuit portion and the second pixel circuit portion comprises:

a first transistor including a first gate electrode connected to a first node, and a first electrode connected to a second node; and a second transistor connected between the first node and the data line and including a second gate electrode capable of receiving a first scan signal, and the shielding pattern includes an asymmetrical portion disposed between the second gate electrode of the first pixel circuit portion and the first electrode of the first pixel circuit portion in a plan view.

* * * * *